United States Patent
Ni et al.

(10) Patent No.: US 10,541,911 B2
(45) Date of Patent: Jan. 21, 2020

(54) METHOD, APPARATUS, AND SYSTEM FOR DEPLOYING SERVICE FLOW FORWARDING FUNCTION

(71) Applicant: Huawei Technologies Co., Ltd., Shenzhen (CN)

(72) Inventors: Hui Ni, Beijing (CN); Yongcui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/982,471

(22) Filed: May 17, 2018

(65) Prior Publication Data
US 2018/0270148 A1    Sep. 20, 2018

Related U.S. Application Data

(63) Continuation of application No. PCT/CN2015/096181, filed on Dec. 1, 2015.

(51) Int. Cl.
*H04L 12/721*    (2013.01)
*H04L 12/46*    (2006.01)
(Continued)

(52) U.S. Cl.
CPC ......... *H04L 45/38* (2013.01); *H04L 12/4633* (2013.01); *H04L 47/122* (2013.01); *H04L 41/0663* (2013.01); *H04L 45/22* (2013.01)

(58) Field of Classification Search
None
See application file for complete search history.

(56) References Cited

U.S. PATENT DOCUMENTS 9,179,007 B1 *  11/2015  Yadav ................. H04M 15/66
                                                  370/328
2014/0241356 A1   8/2014  Zhang et al.
(Continued)

FOREIGN PATENT DOCUMENTS

CN    102857416 A    1/2013
CN    103813336 A    5/2014
(Continued)

OTHER PUBLICATIONS

"OpenFlow Switch Specification" Version 1.2 (Wire Protocol 0x03), pp. 1-85, Open Networking Foundation (Dec. 5, 2011).
(Continued)

*Primary Examiner* — Anh Vu H Ly
(74) *Attorney, Agent, or Firm* — Leydig, Voit & Mayer, Ltd.

(57) ABSTRACT

The present invention provides a method, an apparatus, and a system for deploying a service flow forwarding function. The method includes: sending, by a control plane network element, a notification message to an infrastructure controller, the notification message includes at least one forwarding identifier corresponding to a user service flow and includes an identifier of a target forwarding plane network element providing service processing for the user service flow; the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller. The present invention is used for service flow forwarding, resolves a problem that flexibility of service flow forwarding is relatively low, and achieves an effect of improving flexibility of service flow forwarding.

15 Claims, 24 Drawing Sheets

(51) Int. Cl.
H04L 12/803 (2013.01)
*H04L 12/24* (2006.01)
*H04L 12/707* (2013.01)

(56) References Cited

U.S. PATENT DOCUMENTS

| | | | | |
|---|---|---|---|---|
| 2015/0071171 A1* | 3/2015 | Akiyoshi | ............... | H04L 49/70 370/328 |
| 2015/0138952 A1* | 5/2015 | Tamura | ................. | H04L 45/58 370/225 |
| 2015/0236912 A1 | 8/2015 | Zhang | | |
| 2015/0280927 A1* | 10/2015 | Liang | .................. | H04L 45/38 370/259 |
| 2015/0334045 A1* | 11/2015 | Tremblay | ............ | H04L 47/783 709/226 |
| 2016/0119157 A1* | 4/2016 | Hua | ................... | H04L 61/2069 370/312 |
| 2016/0164835 A1* | 6/2016 | Hoffmann | .......... | H04L 63/0272 726/1 |
| 2016/0241467 A1* | 8/2016 | Gunasekaran | ......... | H04L 45/42 370/328 |
| 2016/0294682 A1* | 10/2016 | Bi | ....................... | H04W 76/10 370/328 |
| 2016/0330045 A1* | 11/2016 | Tang | .................... | H04L 12/462 370/328 |
| 2016/0374095 A1* | 12/2016 | Jeon | ....................... | H04L 41/04 370/328 |
| 2017/0019271 A1 | 1/2017 | Li et al. | | |
| 2017/0041220 A1* | 2/2017 | Zhang | ................... | H04L 45/302 370/328 |
| 2017/0078927 A1* | 3/2017 | Hahn | .................... | H04W 40/36 370/328 |
| 2018/0248788 A1* | 8/2018 | Tsiatsis | .................. | H04L 45/38 370/238 |
| 2018/0262424 A1* | 9/2018 | Roeland | ............. | H04L 12/4633 370/328 |

FOREIGN PATENT DOCUMENTS

| | | |
|---|---|---|
| CN | 104468396 A | 3/2015 |
| CN | 104869178 A | 8/2015 |
| CN | 104954288 A | 9/2015 |
| CN | 105009521 A | 10/2015 |
| EP | 3086513 A1 | 10/2016 |
| WO | 2014209007 A1 | 12/2014 |

OTHER PUBLICATIONS

Kaippallimalil et al., "Network Virtualization and Direct Ethernet Transport for Packet Data Network Connections in 5G wireless," 2014 IEEE Global Communications Conference, 1836-1841 (Feb. 12, 2015).

Banik et al., "Enabling Distributed Mobility Management: A Unified Wireless Network Architecture Based on Virtualized Core Network," 2015 24th Int'l Conference on Computer Comm. and Networks (ICCCN) IEEE, 6 pp. (Aug. 3, 2016).

Sama et al.,"Software-defined control of the virtualized mobile packet core," IEEE Communications Magazine, 53(2): 107-115 (Feb. 2, 2015).

* cited by examiner

301

A control plane network element sends a notification message to an infrastructure controller, where the notification message includes at least one forwarding identifier corresponding to a user service flow and includes an identifier of a target forwarding plane network element providing service processing for the user service flow; where the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller

An infrastructure controller receives a notification message sent by a control plane network element, where the notification message includes at least one forwarding identifier corresponding to a user service flow and includes an identifier of a target forwarding plane network element providing service processing for the user service flow

402

The infrastructure controller determines, according to the notification message, a first forwarding rule including the at least one forwarding identifier and the identifier of the target forwarding plane network element, where the first forwarding rule is used to instruct to forward the user service flow

403

The infrastructure controller sends the first forwarding rule to an infrastructure forwarder controlled by the infrastructure controller

FIG. 4

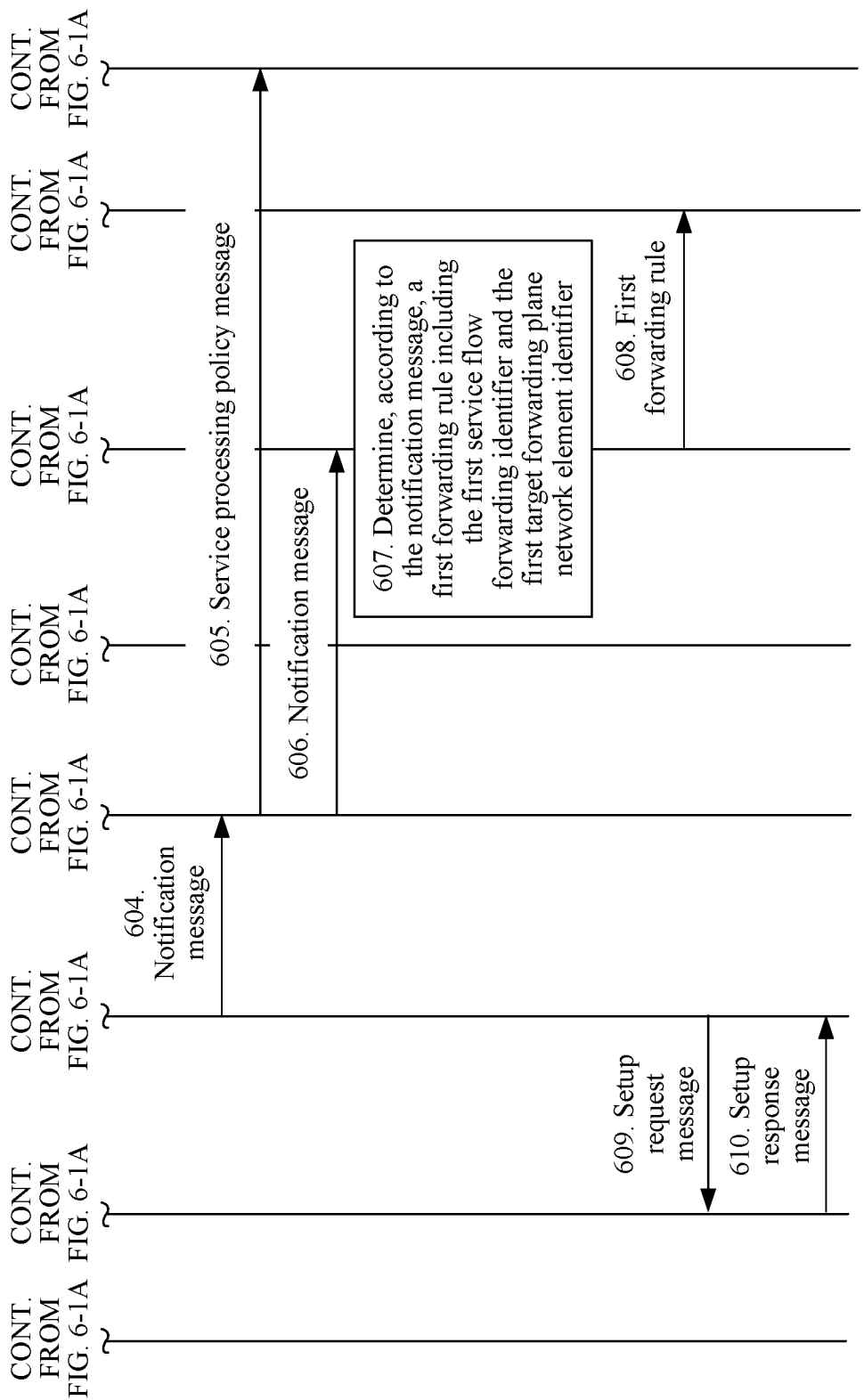

METHOD, APPARATUS, AND SYSTEM FOR DEPLOYING SERVICE FLOW FORWARDING FUNCTION

CROSS-REFERENCE TO RELATED APPLICATIONS

This application is a continuation of International Application No. PCT/CN2015/096181, filed on Dec. 1, 2015, the disclosure of which is hereby incorporated by reference in its entirety.

TECHNICAL FIELD

The present invention relates to the field of communications technologies, and in particular, to a method, an apparatus, and a system for deploying a service flow forwarding function.

BACKGROUND

In an evolved packet system (EPS), a serving gateway (S-GW) and a packet data network gateway (P-GW), as forwarding plane network elements, have both a forwarding function and a logic control function. Because load of the forwarding plane network elements is relatively heavy, the OpenFlow protocol emerges. The OpenFlow protocol changes conventional physical fixed hardware into a dynamically programmable software defined network (SDN), and separates a control plane network element of a gateway from a forwarding plane network element. The control plane network element controls the forwarding plane network element by using the OpenFlow protocol, so that the forwarding plane network element forwards a service flow. Each service flow includes a plurality of different packets.

In the prior art, an SDN concept is introduced into an EPS core network, namely, an evolved packet core network (EPC), and a network structure in which a control plane network element GW-C of a gateway is separated from a forwarding plane network element GW-U is obtained. As shown in FIG. 1, a control plane network element GW-C01 and other control plane network elements such as a mobility management entity (MME) 02, a policy and charging rules function (PCRF) device 03, and a home subscriber server (HSS) 04 are deployed in a centralized manner. The control plane network element GW-C01 is configured to decide a processing rule for packets of a service flow of user equipment (UE), and send the processing rule to a forwarding plane network element GW-U05 by using an interface (the interface may use the OpenFlow protocol) between the control plane network element GW-C01 and the forwarding plane network element GW-U05. Then the forwarding plane network element GW-U05 processes the packets of the service flow of the UE according to the processing rule, and sends the processed packets of the service flow to an external data network 06. In FIG. 1, a base station 07 first sends the packets of the service flow of the UE to a backhaul network, namely, a backhaul network 08, and then the backhaul network 08 sends the packets to the forwarding plane network element GW-U05. Because the backhaul network 08 forwards the packets of the service flow based on an IP address, an IP address of the forwarding plane network element is bound with the corresponding forwarding plane network element, so that the packets of the service flow of the UE are smoothly routed to the corresponding forwarding plane network element.

In a process of implementing the present invention, the inventors find that the prior art has at least the following problem:

In an actual deployment scenario, for example, in a data center cloud platform or a network function virtualization (NFV) platform, a forwarding function is deployed in a form of a virtualized network function (VNF). Because the VNF is characterized by a dynamically scalable capacity, a service flow may need to be frequently redirected between different VNFs. However, because an IP address of a forwarding plane network element is bound with the corresponding forwarding plane network element, and the IP address needs to be bound and unbound in a service flow redirection process, the service flow cannot be frequently redirected between different VNFs smoothly. Therefore, flexibility of service flow forwarding is relatively low.

SUMMARY

To resolve the problem in the prior art, the present invention provides a method, an apparatus, and a system for deploying a service flow forwarding function. The technical solutions are as follows:

According to a first aspect, a method for deploying a service flow forwarding function is provided and applied to a control plane network element, and the method includes:
  sending, by the control plane network element, a notification message to an infrastructure controller, where the notification message includes at least one forwarding identifier corresponding to a user service flow and includes an identifier of a target forwarding plane network element providing service processing for the user service flow; where
  the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller.

According to a second aspect, a method for deploying a service flow forwarding function is provided and applied to an infrastructure controller, and the method includes:
  receiving, by the infrastructure controller, a notification message sent by a control plane network element, where the notification message includes at least one forwarding identifier corresponding to a user service flow and includes an identifier of a target forwarding plane network element providing service processing for the user service flow;
  determining, by the infrastructure controller according to the notification message, a first forwarding rule including the at least one forwarding identifier and the identifier of the target forwarding plane network element, where the first forwarding rule is used to instruct to forward the user service flow; and
  sending, by the infrastructure controller, the first forwarding rule to an infrastructure forwarder controlled by the infrastructure controller.

According to a third aspect, an apparatus for deploying a service flow forwarding function is provided and applied to a control plane network element, and the apparatus includes:
  a first sending unit, configured to send a notification message to an infrastructure controller, where the notification message includes at least one forwarding identifier corresponding to a user service flow and includes an identifier of a target forwarding plane network element providing service processing for the user service flow; where the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller.

According to a fourth aspect, an apparatus for deploying a service flow forwarding function is provided and applied to an infrastructure controller, and the apparatus includes:

a first receiving unit, configured to receive a notification message sent by a control plane network element, where the notification message includes at least one forwarding identifier corresponding to a user service flow and includes an identifier of a target forwarding plane network element providing service processing for the user service flow;

a first determining unit, configured to determine, according to the notification message, a first forwarding rule including the at least one forwarding identifier and the identifier of the target forwarding plane network element, where the first forwarding rule is used to instruct to forward the user service flow; and a first sending unit, configured to send the first forwarding rule to an infrastructure forwarder controlled by the apparatus for deploying a service flow forwarding function.

According to a fifth aspect, an apparatus for deploying a service flow forwarding function is provided and applied to a control plane network element, and the apparatus includes:

a transmitter, configured to send a notification message to an infrastructure controller, where the notification message includes at least one forwarding identifier corresponding to a user service flow and includes an identifier of a target forwarding plane network element providing service processing for the user service flow; where the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller.

According to a sixth aspect, an apparatus for deploying a service flow forwarding function is provided and applied to an infrastructure controller, and the apparatus includes:

a receiver, configured to receive a notification message sent by a control plane network element, where the notification message includes at least one forwarding identifier corresponding to a user service flow and includes an identifier of a target forwarding plane network element providing service processing for the user service flow;

a processor, configured to determine, according to the notification message, a first forwarding rule including the at least one forwarding identifier and the identifier of the target forwarding plane network element, where the first forwarding rule is used to instruct to forward the user service flow; and a transmitter, configured to send the first forwarding rule to an infrastructure forwarder controlled by the apparatus for deploying a service flow forwarding function.

According to a seventh aspect, a system for deploying a service flow forwarding function is provided, where the system includes a control plane network element, an infrastructure controller, a forwarding plane network element, an infrastructure forwarder, a base station, user equipment UE, and a packet data network, where the control plane network element includes any apparatus for deploying a service flow forwarding function according to the third aspect; and the infrastructure controller includes any apparatus for deploying a service flow forwarding function according to the fourth aspect.

According to an eighth aspect, a system for deploying a service flow forwarding function is provided, where the system includes a control plane network element, an infrastructure controller, a forwarding plane network element, an infrastructure forwarder, a base station, user equipment UE, and a packet data network, where the control plane network element includes any apparatus for deploying a service flow forwarding function according to the fifth aspect; and the infrastructure controller includes any apparatus for deploying a service flow forwarding function according to the sixth aspect.

Beneficial effects of the technical solutions provided by the present invention are as follows:

In the method, apparatus, and system for deploying a service flow forwarding function according to the present invention, the infrastructure controller can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of the control plane network element and the forwarding plane network element, configuration of an end-to-end forwarding rule is implemented through interaction between the control plane network element and the infrastructure controller. Therefore, flexibility of service flow forwarding is improved.

It should be understood that, the foregoing general description and the following detailed description are merely illustrative and explanative, and are not intended to limit the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a flowchart of a method for deploying a service flow forwarding function according to an embodiment of the present invention;

FIG. 4 is a flowchart of a method for deploying a service flow forwarding function according to an embodiment of the present invention;

FIG. 5-1 is a flowchart of a method for deploying a service flow forwarding function according to an embodiment of the present invention;

FIG. 5-2 is a schematic diagram of an implementation environment in the embodiment shown in FIG. 5-1;

FIG. 5-3 is a flowchart of a method for deploying a service flow forwarding function according to an embodiment of the present invention;

FIG. 5-4 is a flowchart of a method for deploying a service flow forwarding function according to an embodiment of the present invention;

FIG. 6-1A and FIG. 6-1B are a flowchart of a method for deploying a service flow forwarding function according to an embodiment of the present invention;

FIG. 6-2 is a schematic diagram of an implementation environment in the embodiment shown in FIG. 6-1A and FIG. 6-1B;

FIG. 7-1 is a flowchart of a method for deploying a service flow forwarding function according to an embodiment of the present invention;

FIG. 7-2 is a schematic diagram of an implementation environment in the embodiment shown in FIG. 7-1;

FIG. 9-1 is a block diagram of an apparatus for deploying a service flow forwarding function according to an embodiment of the present invention;

FIG. 9-2 is a block diagram of an apparatus for deploying a service flow forwarding function according to an embodiment of the present invention;

FIG. 9-3 is a block diagram of an apparatus for deploying a service flow forwarding function according to an embodiment of the present invention;

FIG. 9-4 is a block diagram of an apparatus for deploying a service flow forwarding function according to an embodiment of the present invention;

FIG. 9-5 is a block diagram of an apparatus for deploying a service flow forwarding function according to an embodiment of the present invention;

FIG. 9-6 is a block diagram of an apparatus for deploying a service flow forwarding function according to an embodiment of the present invention;

FIG. 9-7 is a block diagram of an apparatus for deploying a service flow forwarding function according to an embodiment of the present invention;

FIG. 9-8 is a block diagram of an apparatus for deploying a service flow forwarding function according to an embodiment of the present invention;

FIG. 10-1 is a block diagram of an apparatus for deploying a service flow forwarding function according to an embodiment of the present invention;

FIG. 10-2 is a block diagram of an apparatus for deploying a service flow forwarding function according to an embodiment of the present invention;

FIG. 10-3 is a block diagram of an apparatus for deploying a service flow forwarding function according to an embodiment of the present invention;

FIG. 11-1 is a block diagram of an apparatus for deploying a service flow forwarding function according to an embodiment of the present invention;

FIG. 11-2 is a block diagram of an apparatus for deploying a service flow forwarding function according to an embodiment of the present invention.

Specific embodiments of the present invention are already shown in the accompanying drawings, and more detailed descriptions are provided hereinafter. The accompanying drawings and the text descriptions are not intended to limit the scope of the inventive concept in any manner, but intended to describe the inventive concept for a person skilled in the art by referring to specific embodiments.

DESCRIPTION OF EMBODIMENTS

To make the objectives, technical solutions, and advantages of the present invention clearer, the following further describes the implementations of the present invention in detail with reference to the accompanying drawings.

Figure 2:
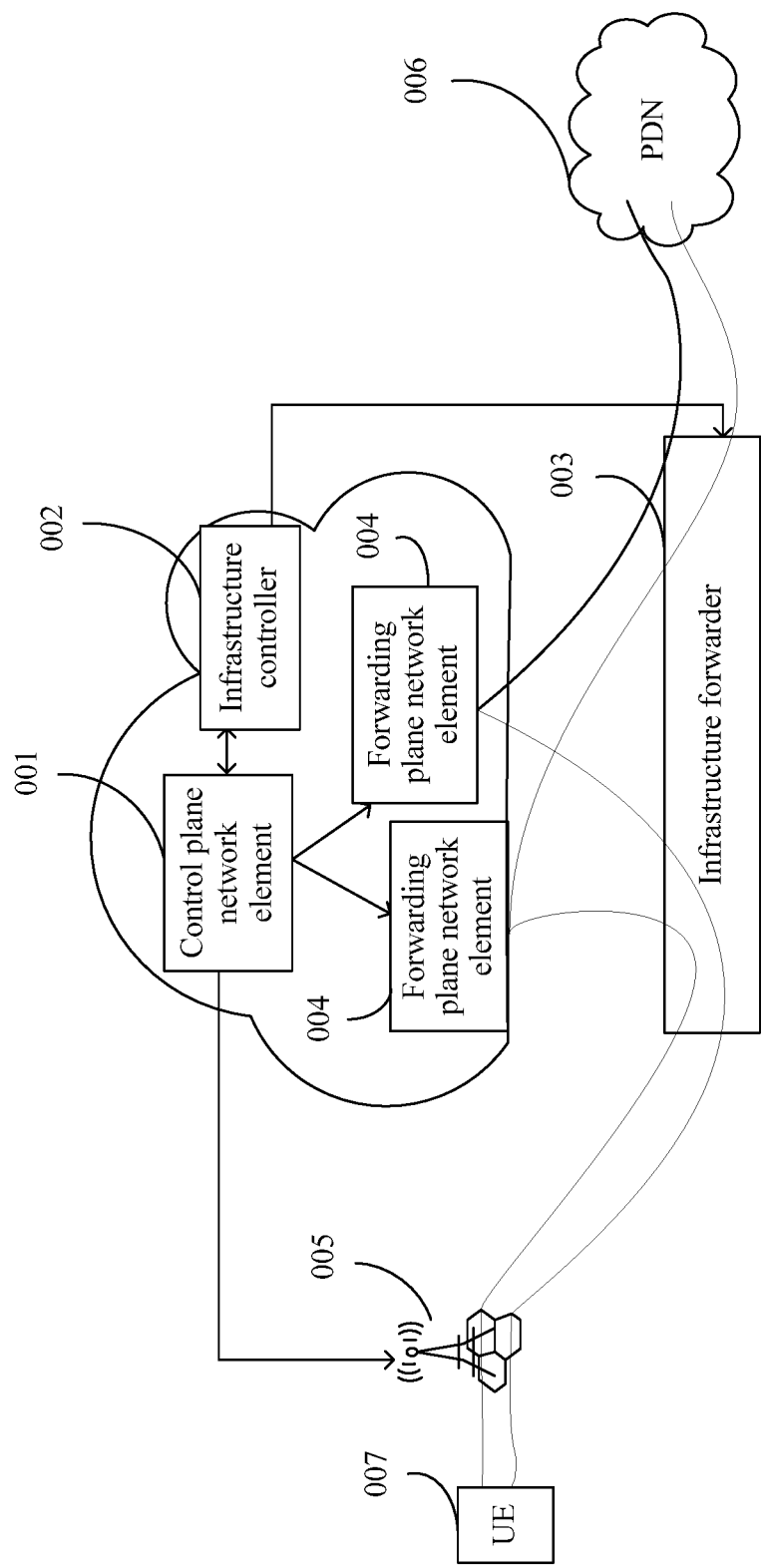
FIG. 2 is a schematic diagram of an implementation environment provided in each embodiment of the present invention.

FIG. 2 is a schematic diagram of an implementation environment in each embodiment of the present invention. The implementation environment may include a control plane network element (Mobility Controller) 001, an infrastructure controller (Cloud Controller) 002, an infrastructure forwarder (Infrastructure Switch) 003, at least one forwarding plane network element (GW-U) 004, a base station (BS) 005, a packet data network (PDN) 006, and UE 007.

The UE 007 is a network terminal device, and includes but is not limited to a mobile phone, a network access terminal device, an Internet of Things terminal device, or the like.

The BS 005 is a device providing wireless access for the network terminal device, and includes but is not limited to an eNodeB (Evolved NodeB), a Wireless Fidelity (Wi-Fi) access point (AP), a Worldwide Interoperability for Microwave Access (WiMAX) BS, or the like.

The control plane network element 001 is a network element responsible for mobility management or forwarding path management in a mobile network, and has all or some functions of an MME, a GW-C, or a mobility gateway controller formed by integration of the foregoing network elements and an SDN controller.

The infrastructure controller 002 has a cloud platform function responsible for managing a forwarding path, for example, is a cloud platform infrastructure controller such as at least one of a cloud platform management and orchestration (MANO) domain system or an SDN controller. The cloud platform management and orchestration domain is an NFV management and orchestration domain. The cloud platform management and orchestration domain is a management system in a cloud network. After network virtualization evolves to network function virtualization NFV, for deployment and management of virtualized functions, the MANO implements functions such as virtual network element deployment and lifecycle management according to a configuration script.

The forwarding plane network element 004 is a mobile network element performing service processing on packets of a user, and may implement processing functions such as online or offline charging, deep packet inspection (DPI), cache, lawful interception, Transmission Control Protocol (TCP) acceleration, Hypertext Transfer Protocol (HTTP) header enrichment, and packet forwarding.

The infrastructure forwarder 003 is a network element for implementing packet forwarding in a network, such as an SDN switch, a fixed network switch, or a router.

When the control plane network element 001 allocates or modifies, for the forwarding plane network element 004, a forwarding identifier corresponding to a user service flow, the control plane network element 001 can send an allocation or modification message to the infrastructure controller 002 by using an eastbound/westbound interface, so that the infrastructure controller 002 configures a forwarding path of an infrastructure network synchronously. In this way, dynamic distribution and redirection of the user service flow between different VNFs are implemented.

In the embodiments of the present invention, processing such as quality of service (QoS) control, online or offline charging, DPI, cache, lawful interception, TCP acceleration, HTTP header enrichment, and packet forwarding processing operations may be performed on packets according to a service processing policy delivered by the control plane network element to the forwarding plane network element. A packet forwarding processing operation, for example, a downlink packet forwarding processing operation, is: forwarding plane network element→infrastructure forwarder→BS. The forwarding processing operation may be implemented based on an identifier such as an Internet Protocol (IP) address of the forwarding plane network element, a Media Access Control (MAC) address of the forwarding plane network element, or a port number of the forwarding plane network element, or may be implemented based on a point-to-point tunnel or in another forwarding manner or the like, or may be implemented based on a forwarding mechanism of a service chain. This is not limited in the embodiments of the present invention. In the embodiments of the present invention, an interface between the control plane network element 001 and the forwarding plane network element 004, and an interface between the infrastructure controller 002 and the infrastructure forwarder 003 may be implemented by using the OpenFlow protocol, or may be implemented by using another control protocol. This is not limited in the embodiments of the present invention. In addition, the determined forwarding identifier corresponding to the user service flow in the embodiments of the present invention may be an IP address of the forwarding plane network element, or an IP address and a tunnel endpoint identifier (TEID) of the forwarding plane network element, or an IP address of the UE, or an IP address and a port number of the UE, or an IP quintuple of the user service flow, or the like. An identifier of a target forwarding plane network element in the embodiments of the present invention may be a MAC address of the forwarding plane network element, or an IP address of the forwarding plane network element, or a port number of the forwarding plane network element, or the like. It should be noted that, the forwarding identifier corresponding to the user service flow and the identifier of the target forwarding plane network element may also be other identifiers, and are not limited in the embodiments of the present invention.

Figures 1, 5:
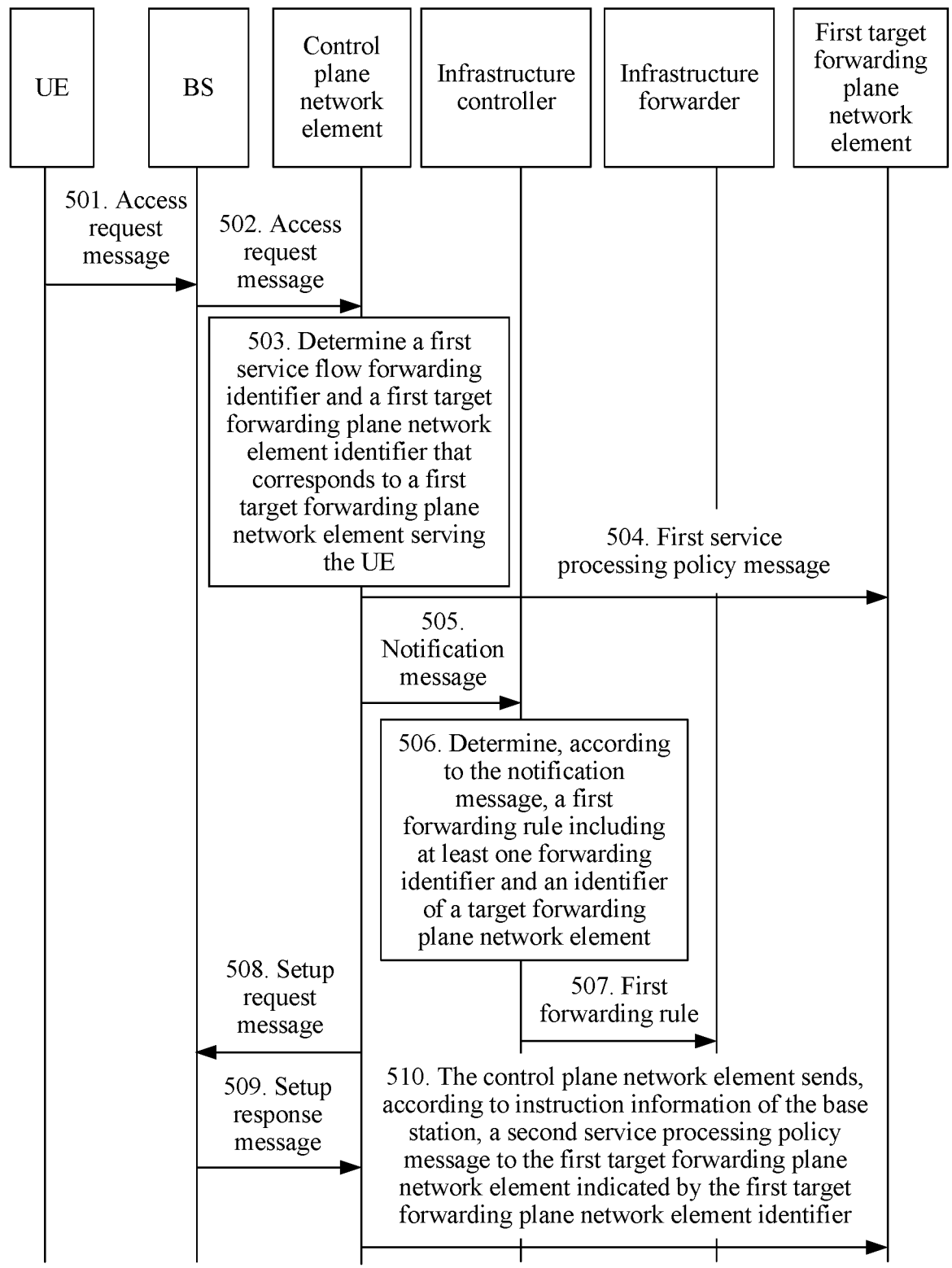
Figures 2, 5:
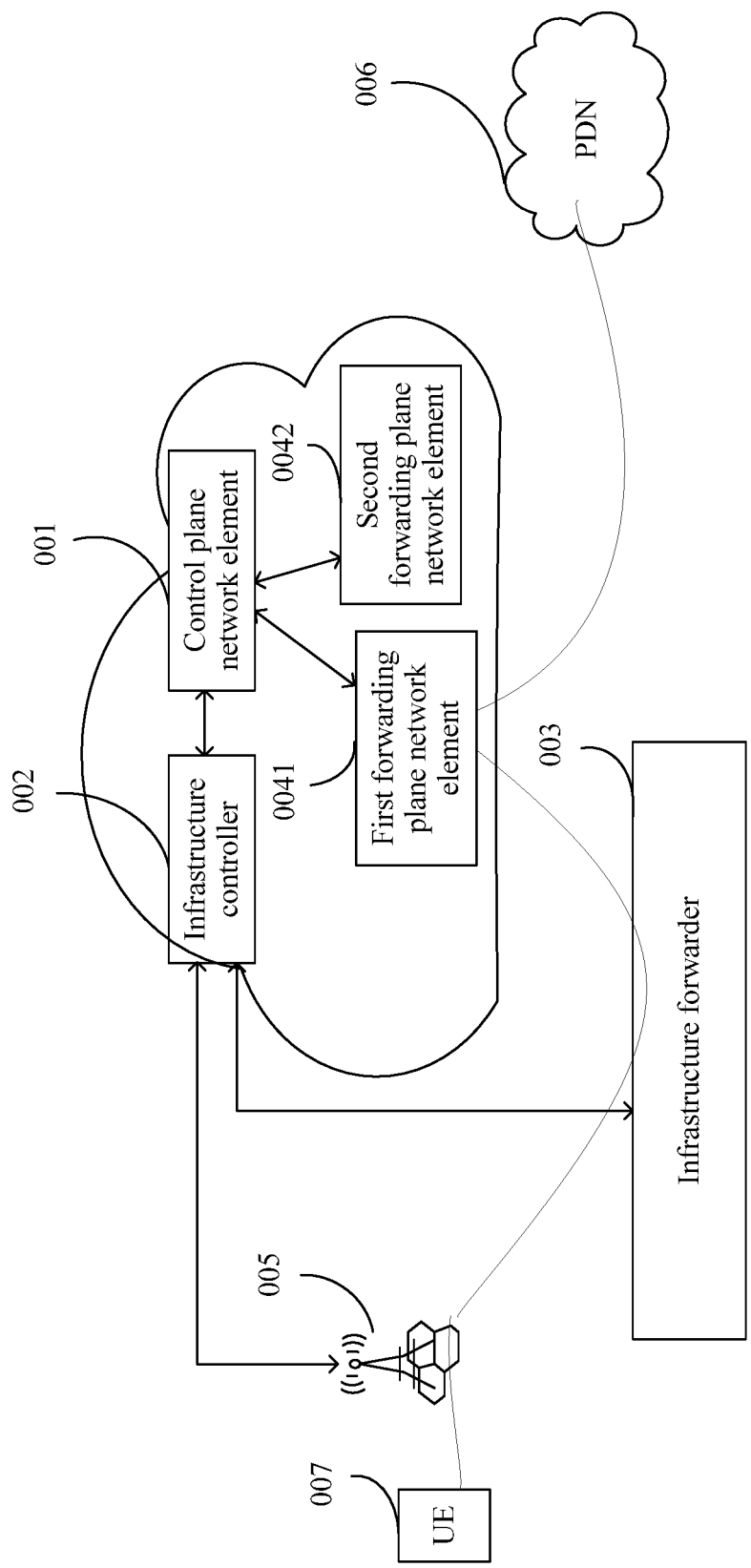
Figures 3, 5:
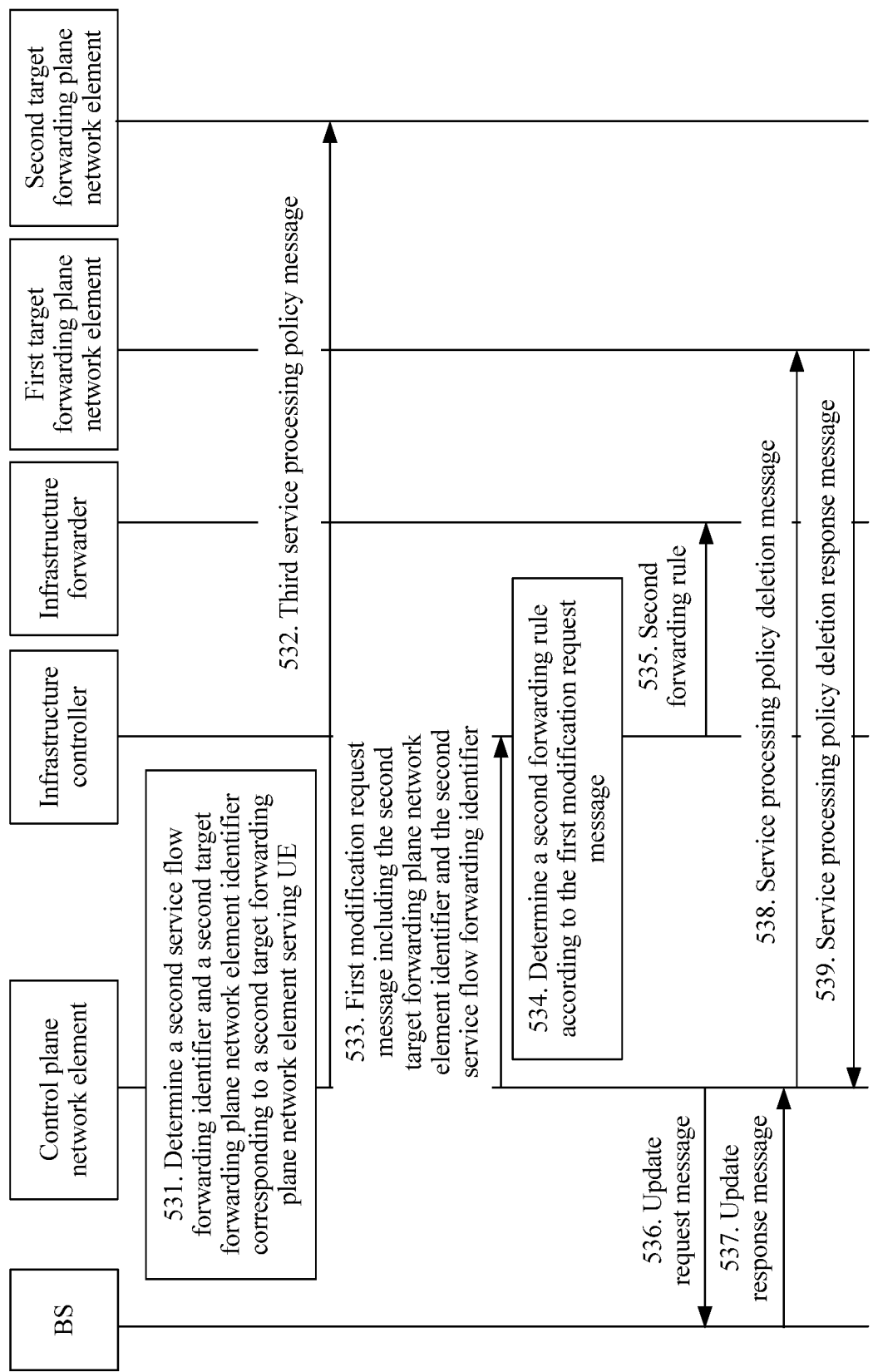

FIG. 3 is a flowchart of a method for deploying a service flow forwarding function according to an embodiment of the present invention. The method may be applied to the control plane network element 001 in FIG. 2. As shown in FIG. 3, the method may include:

Step 301: A control plane network element sends a notification message to an infrastructure controller, where the notification message includes at least one forwarding identifier corresponding to a user service flow and includes an identifier of a target forwarding plane network element providing service processing for the user service flow; where the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller.

In summary, in the method for deploying a service flow forwarding function according to this embodiment of the present invention, the control plane network element can send the notification message to the infrastructure controller, and the notification message is used to instruct the infrastructure controller to determine the first forwarding rule including the at least one forwarding identifier and the identifier of the target forwarding plane network element and send the first forwarding rule to the infrastructure forwarder controlled by the infrastructure controller. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Optionally, after the control plane network element determines a first target forwarding plane network element serving user equipment UE, the at least one forwarding identifier corresponding to the user service flow is determined by the first target forwarding plane network element.

Optionally, the at least one forwarding identifier corresponding to the user service flow is a first service flow forwarding identifier, and before the control plane network element sends the notification message to the infrastructure controller, the method further includes:

the control plane network element receives an access request message from user equipment UE;

the control plane network element determines the first service flow forwarding identifier and a first target forwarding plane network element identifier that corresponds to a first target forwarding plane network element serving the UE; and the control plane network element sends a first service processing policy message to the first target forwarding plane network element indicated by the first target forwarding plane network element identifier, where the first service processing policy message includes the first service flow forwarding identifier and a first service processing policy, and the first service processing policy is a policy for performing service processing on packets of the user service flow by the first target forwarding plane network element.

Optionally, after the control plane network element sends the notification message to the infrastructure controller, the method further includes:

the control plane network element receives an access request message from user equipment UE;

the control plane network element determines a first target forwarding plane network element identifier that corresponds to a first target forwarding plane network element serving the UE;

the control plane network element determines, according to the first target forwarding plane network element identifier, a first service flow forwarding identifier from the at least one forwarding identifier corresponding to the user service flow corresponding to the first target forwarding plane network element identifier; and the control plane network element sends a first service processing policy message to the first target forwarding plane network element indicated by the first target forwarding plane network element identifier, where the first service processing policy message includes the first service flow forwarding identifier and a first service processing policy, and the first service processing policy is a policy for performing service processing on packets of the user service flow by the first target forwarding plane network element.

Optionally, after the control plane network element sends the first service processing policy message to the first target forwarding plane network element indicated by the first target forwarding plane network element identifier, the method further includes:

the control plane network element sends a setup request message to a base station accessed by the UE, where the setup request message includes the first service flow forwarding identifier.

Optionally, after the control plane network element sends the setup request message to the base station accessed by the UE, the method further includes:

the control plane network element receives a setup response message sent by the base station, where the setup response message includes instruction information of the base station; and the control plane network element sends, according to the instruction information of the base station, a second service processing policy message to the first target forwarding plane network element indicated by the first target forwarding plane network element identifier, where the second service processing policy message includes the instruction information of the base station and a second service processing policy, and the second service processing policy is a policy for performing service processing on downlink packets of the user service flow by the first target forwarding plane network element.

Optionally, after the control plane network element sends the setup request message to the base station accessed by the UE, the method further includes:

the control plane network element determines a second service flow forwarding identifier and a second target forwarding plane network element identifier corresponding to a second target forwarding plane network element serving the UE;

the control plane network element sends a third service processing policy message to the second target forwarding plane network element indicated by the second target forwarding plane network element identifier, where the third service processing policy message includes the second service flow forwarding identifier and a third service processing policy, and the third service processing policy is a policy for performing service processing on uplink packets or downlink packets of the user service flow by the second target forwarding plane network element; and the control plane network element sends a first modification request message including the second target forwarding plane network element identifier and the second service flow forwarding identifier to the infrastructure controller, where the first modification request message is used to instruct the infrastructure controller to determine a second forwarding rule including the second target forwarding plane network element identifier and the second service flow forwarding identifier and send the second forwarding rule to the infrastructure forwarder.

Optionally, after the control plane network element sends the third service processing policy message to the second target forwarding plane network element indicated by the second target forwarding plane network element identifier, the method further includes:

the control plane network element sends an update request message to the base station, where the update request message includes the second service flow forwarding identifier.

Optionally, after the control plane network element sends the setup request message to the base station accessed by the UE, the method further includes:

the control plane network element sends a service processing policy deletion message to the first target forwarding plane network element, where the service processing policy deletion message is used to instruct the first target forwarding plane network element to delete at least one of the first service processing policy message or the second service processing policy message.

Optionally, after the control plane network element sends the update request message to the base station, the method further includes:

the control plane network element sends a first deletion request message to the infrastructure controller, where the first deletion request message includes the first service flow forwarding identifier and the first target forwarding plane network element identifier.

Optionally, the control plane network element includes a mobility controller and a first software defined network controller, and that a control plane network element sends a notification message to an infrastructure controller includes:

the control plane network element sends the notification message to the infrastructure controller by using the mobility controller and the first software defined network controller.

Optionally, each forwarding identifier in the at least one forwarding identifier is an Internet Protocol IP address of a forwarding plane network element, or an IP address and a tunnel endpoint identifier TEID of a forwarding plane network element, or an IP address of the user equipment UE, or an IP address and a port number of the UE, or an IP quintuple of the user service flow; and the identifier of the target forwarding plane network element is a Media Access Control MAC address of the forwarding plane network element, or an IP address of the forwarding plane network element, or a port number of the forwarding plane network element.

In summary, in the method for deploying a service flow forwarding function according to this embodiment of the present invention, the control plane network element can send the notification message to the infrastructure controller, and the notification message is used to instruct the infrastructure controller to determine the first forwarding rule including the at least one forwarding identifier and the identifier of the target forwarding plane network element and send the first forwarding rule to the infrastructure forwarder controlled by the infrastructure controller. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figures 4, 5:
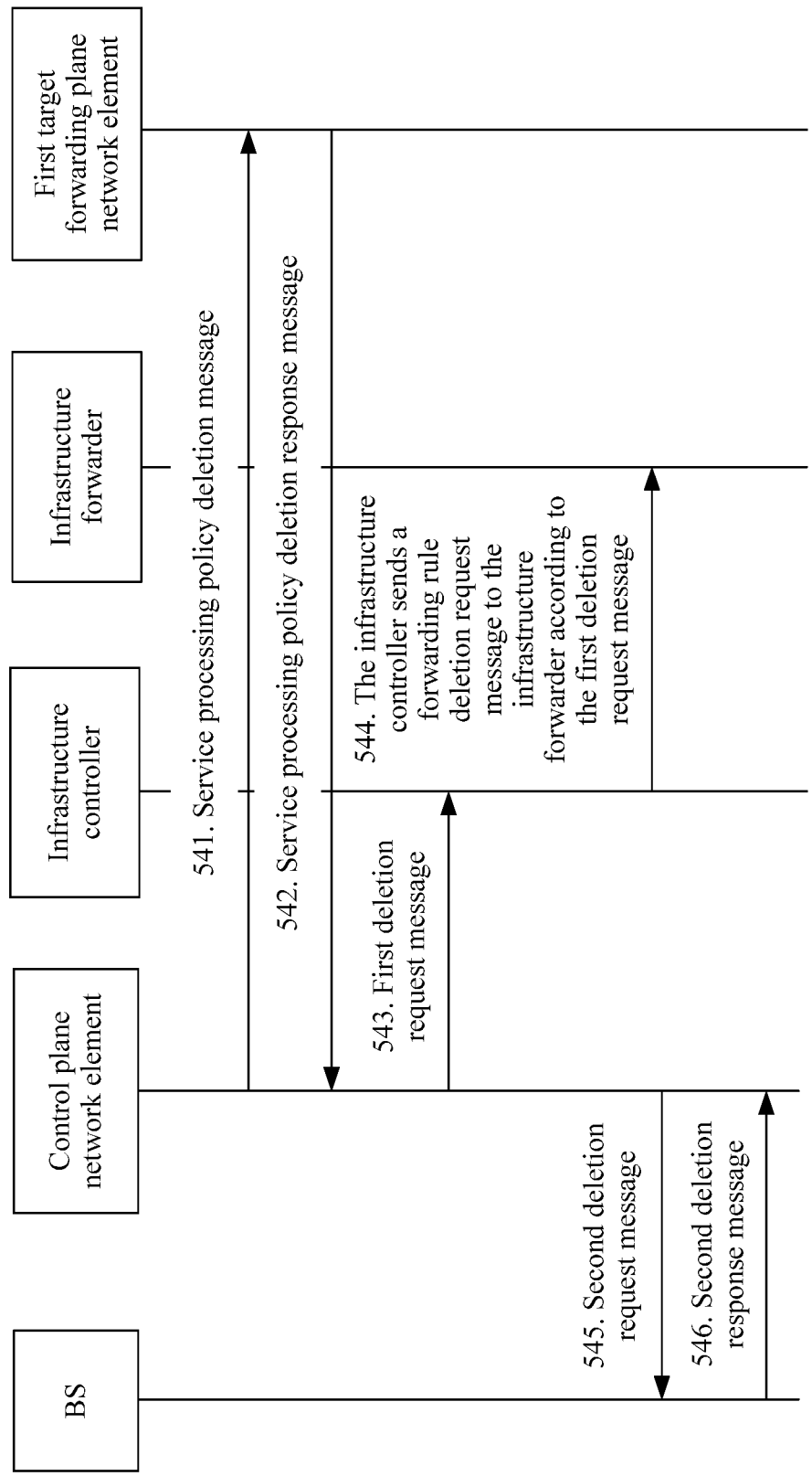

FIG. 4 is a flowchart of a method for deploying a service flow forwarding function according to an embodiment of the present invention. The method may be applied to the infrastructure controller 002 in FIG. 2. As shown in FIG. 4, the method may include the following steps.

Step 401: An infrastructure controller receives a notification message sent by a control plane network element, where the notification message includes at least one forwarding identifier corresponding to a user service flow and includes an identifier of a target forwarding plane network element providing service processing for the user service flow.

Step 402: The infrastructure controller determines, according to the notification message, a first forwarding rule including the at least one forwarding identifier and the identifier of the target forwarding plane network element, where the first forwarding rule is used to instruct to forward the user service flow.

Step 403: The infrastructure controller sends the first forwarding rule to an infrastructure forwarder controlled by the infrastructure controller.

In summary, in the method for deploying a service flow forwarding function according to this embodiment of the present invention, the infrastructure controller can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Optionally, the at least one forwarding identifier corresponding to the user service flow is a first service flow forwarding identifier, the first service flow forwarding identifier is determined by the control plane network element after the control plane network element receives an access request message from user equipment UE, and after the infrastructure controller sends the first forwarding rule to the infrastructure forwarder controlled by the infrastructure controller, the method further includes:

the infrastructure controller receives a first modification request message including a second target forwarding plane network element identifier and a second service flow forwarding identifier and sent by the control plane network element, where the first modification request message is sent to the infrastructure controller after the control plane network element determines that a target forwarding plane network element serving the UE changes, and the second target forwarding plane network element identifier and the second service flow forwarding identifier are determined by the control plane network element;

the infrastructure controller determines a second forwarding rule according to the first modification request message, where the second forwarding rule includes the second target forwarding plane network element identifier and the second service flow forwarding identifier; and the infrastructure controller sends the second forwarding rule to the infrastructure forwarder.

Optionally, after the infrastructure controller sends the first forwarding rule to an infrastructure forwarder controlled by the infrastructure controller, the method further includes:

the infrastructure controller receives a first deletion request message sent by the control plane network element, where the first deletion request message includes a first service flow forwarding identifier and a first target forwarding plane network element identifier, and the first service flow forwarding identifier and the first target forwarding plane network element identifier are determined by the control plane network element after the control plane network element receives an access request message from user equipment UE; and the infrastructure controller sends a forwarding rule deletion request message to the infrastructure forwarder according to the first deletion request message, where the forwarding rule deletion request message is used to instruct the infrastructure forwarder to delete the first forwarding rule.

Optionally, the infrastructure controller includes a management and orchestration system and a second software defined network controller, and that an infrastructure controller receives a notification message sent by a control plane network element includes:

the infrastructure controller receives, by using the second software defined network controller, the notification message sent by the control plane network element;

that the infrastructure controller determines, according to the notification message, a first forwarding rule including the at least one forwarding identifier and the identifier of the target forwarding plane network element includes:

the infrastructure controller determines the first forwarding rule by using the second software defined network controller; and that the infrastructure controller sends the first forwarding rule to an infrastructure forwarder controlled by the infrastructure controller includes:

the infrastructure controller sends the first forwarding rule to the infrastructure forwarder by using the second software defined network controller.

Optionally, each forwarding identifier in the at least one forwarding identifier is an Internet Protocol IP address of a forwarding plane network element, or an IP address and a tunnel endpoint identifier TEID of a forwarding plane network element, or an IP address of the user equipment UE, or an IP address and a port number of the UE, or an IP quintuple of the user service flow; and the identifier of the target forwarding plane network element is a Media Access Control MAC address of the forwarding plane network element, or an IP address of the forwarding plane network element, or a port number of the forwarding plane network element.

In summary, in the method for deploying a service flow forwarding function according to this embodiment of the present invention, the infrastructure controller can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figure 1:
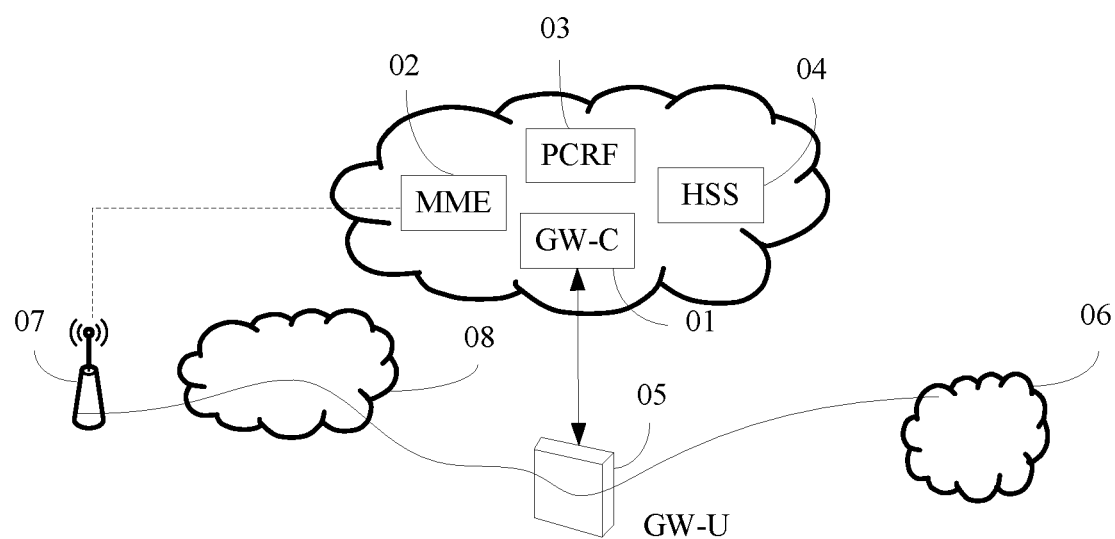
FIG. 1 is a schematic structural diagram of a network in which a control plane network element is separated from a forwarding plane network element in the prior art.

FIG. 5-1 is a flowchart of a method for deploying a service flow forwarding function according to an embodiment of the present invention. The method may be used in an implementation environment shown in FIG. 2, or may be used in an implementation environment shown in FIG. 5-2. In FIG. 5-2, a control plane network element 001 is used as a mobility gateway controller to control at least one forwarding plane network element 004 and a BS 005; and an infrastructure controller 002 is used as a controller in an infrastructure to control an infrastructure forwarder 003. The infrastructure forwarder 003 is configured to forward packets between the BS 005 and the forwarding plane network element 004. 007 denotes UE, and 006 denotes a PDN. At least one forwarding plane network element includes a first forwarding plane network element 0041 and a second forwarding plane network element 0042.

As shown in FIG. 5-1, the method may include the following steps.

Step 501: UE sends an access request message to a BS.

Step 502: The BS sends the access request message to a control plane network element.

The UE sends the access request message to the BS, and the BS sends the access request message to the control plane network element.

Step 503: The control plane network element determines a first service flow forwarding identifier and a first target forwarding plane network element identifier that corresponds to a first target forwarding plane network element serving the UE.

For example, the first target forwarding plane network element identifier may be a MAC address, or an IP address, or a port number of the first target forwarding plane network element; and the first service flow forwarding identifier may be an IP address and a TEID of the first target forwarding plane network element, denoted as (IP1, TEID1). The first target forwarding plane network element may be the first forwarding plane network element 0041.

The first target forwarding plane network element may be determined according to a preconfigured policy of a user or according to current load of forwarding plane network elements.

It should be noted that, the first service flow forwarding identifier may be determined by the control plane network element, or may be determined by the first target forwarding plane network element. When the first service flow forwarding identifier is determined by the first target forwarding plane network element, the process may be as follows: The control plane network element first determines the first target forwarding plane network element identifier that corresponds to the first target forwarding plane network element serving the UE, and then sends a forwarding identifier determining message to the first target forwarding plane network element indicated by the first target forwarding plane network element identifier. The first target forwarding plane network element determines the first service flow forwarding identifier after receiving the forwarding identifier determining message. For example, the first service flow forwarding identifier may be an IP address of the UE.

Step 504: The control plane network element sends a first service processing policy message to the first target forwarding plane network element indicated by the first target forwarding plane network element identifier.

The first service processing policy message includes the first service flow forwarding identifier and a first service processing policy, and the first service processing policy is a policy for performing service processing on packets of a user service flow by the first target forwarding plane network element. Specifically, the first service processing policy message may carry a policy for performing service processing on uplink packets. The first service processing policy message may be generated based on the preconfigured policy, or may be generated based on the first service flow forwarding identifier, or may be generated based on the IP address of the UE. This is not limited in this embodiment of the present invention. Processing such as QoS control, online or offline charging, DPI, cache, lawful interception, TCP acceleration, HTTP header enrichment, and packet forwarding processing operations may be performed on the uplink packets according to the first service processing policy.

Step 505: The control plane network element sends a notification message to an infrastructure controller.

The notification message includes at least one forwarding identifier corresponding to the user service flow and an identifier of a target forwarding plane network element providing service processing for the user service flow.

Specifically, the notification message includes the first service flow forwarding identifier (IP1, TEID1) in step 503 and the first target forwarding plane network element identifier, namely, an identifier of the first forwarding plane network element 0041.

Step 506: The infrastructure controller determines, according to the notification message, a first forwarding rule including at least one forwarding identifier and an identifier of a target forwarding plane network element.

Specifically, the infrastructure controller may determine, according to the notification message, a first forwarding rule including the first service flow forwarding identifier (IP1, TEID1) and the first target forwarding plane network element identifier. The first forwarding rule may be an uplink packet forwarding rule. The first forwarding rule is used to instruct an infrastructure forwarder controlled by the infrastructure controller to perform forwarding processing on the uplink packets according to the first forwarding rule.

Step 507: The infrastructure controller sends the first forwarding rule to an infrastructure forwarder controlled by the infrastructure controller.

The infrastructure controller sends the first forwarding rule to the infrastructure forwarder controlled by the infrastructure controller, so that the infrastructure forwarder can perform forwarding processing on the uplink packets according to the first forwarding rule.

Step 508: The control plane network element sends a setup request message to the BS accessed by the UE.

The setup request message includes the first service flow forwarding identifier. For example, the setup request message includes the first service flow forwarding identifier (IP1, TEID1).

It should be noted that, a sequence of step 504, step 505, and step 508 may be adjusted properly. The sequence of step 504, step 505, and step 508 is not limited in this embodiment of the present invention.

Step 509: The BS sends a setup response message to the control plane network element.

The setup request message in step 508 includes the first service flow forwarding identifier (IP1, TEID1). Therefore, the BS needs to send the setup response message to the control plane network element. The setup response message includes instruction information of the BS, and the instruction information of the BS may be an IP address and a downlink TEID of the BS.

It should be additionally noted that, after the BS sends the setup response message to the control plane network element, a forwarding rule used to instruct the infrastructure forwarder controlled by the infrastructure controller to perform forwarding processing on downlink packets according to the forwarding rule may be determined according to the process of step 505 to step 507, so that the infrastructure forwarder can perform forwarding processing on the downlink packets according to the forwarding rule. The notification message in step 505 includes the IP address and the downlink TEID of the BS.

Step 510: The control plane network element sends, according to instruction information of the base station, a second service processing policy message to the first target forwarding plane network element indicated by the first target forwarding plane network element identifier.

The second service processing policy message includes the instruction information of the base station and a second service processing policy, and the second service processing policy is a policy for performing service processing on the downlink packets of the user service flow by the first target forwarding plane network element.

Up to now, a connection between the UE and a PDN has been set up. When the packets of the user service flow need to be forwarded, as shown in FIG. 5-2, the UE 007 sends an uplink packet to the BS 005; the BS 005 adds the first service flow forwarding identifier to the uplink packet; and subsequently, matching may be performed according to the service processing policy and the forwarding rule corresponding to the first service flow forwarding identifier. The BS 005 sends the uplink packet to the infrastructure forwarder 003 according to a layer-2 (transport layer) or layer-3 (application layer) routing protocol; the infrastructure forwarder 003 forwards the uplink packet to the target forwarding plane network element according to the uplink packet forwarding rule; and then the target forwarding plane network element performs corresponding service processing on the uplink packet according to the first service processing policy, and sends the processed uplink packet to the PDN 006 or a communications peer. The PDN 006 or the communications peer sends a downlink packet to the target forwarding plane network element; then the target forwarding plane network element performs corresponding service processing on the downlink packet according to the second service processing policy, and sends the processed downlink packet to the infrastructure forwarder 003; the infrastructure forwarder 003 forwards the processed downlink packet to the BS 005 according to the downlink packet forwarding rule; and then the BS 005 sends the processed downlink packet to the UE 007.

This embodiment of the present invention provides a process of setting up a connection between the UE and the PDN. In the process of setting up the connection, the control plane network element also notifies the infrastructure controller of the forwarding identifier corresponding to the user service flow when notifying the target forwarding plane network element. Based on the forwarding identifier, the infrastructure controller determines a packet forwarding path for the infrastructure forwarder. In this way, configuration of an end-to-end forwarding rule is implemented. This embodiment of the present invention is described by using an example in which the forwarding identifier corresponding to the user service flow is (IP1, TEID1). In addition, the forwarding identifier may be in another form. This is not limited in this embodiment of the present invention.

It should be additionally noted that, after step 504, or after step 510, the method used in the implementation environment shown in FIG. 5-2 may further include the following steps, as shown in FIG. 5-3.

Step 531: The control plane network element determines a second service flow forwarding identifier and a second target forwarding plane network element identifier corresponding to a second target forwarding plane network element serving the UE.

The control plane network element 001 determines the second service flow forwarding identifier and the second target forwarding plane network element identifier corresponding to the second target forwarding plane network element (namely, the second forwarding plane network element 0042) serving the UE 007. The second service flow forwarding identifier may be an IP address and a TEID of the second forwarding plane network element 0042, denoted as (IP1, TEID2). There are a plurality of reasons for the control plane network element 001 to reselect the second forwarding plane network element 0042 to serve the UE 007: the UE 007 may initiate a bearer resource modification message to the control plane network element 001 by using the BS 005, and after receiving the bearer resource modification message, the control plane network element 001 reselects, according to the preconfigured policy of the user or current load of forwarding plane network elements or a QoS policy in a policy and charging control (PCC) decision, the second forwarding plane network element 0042 to serve the UE 007; or the control plane network element 001 may reselect, according to the preconfigured policy such as expiry of a timer or expiry of a time interval, the second forwarding plane network element 0042 to serve the UE 007.

Step 532: The control plane network element sends a third service processing policy message to the second target forwarding plane network element indicated by the second target forwarding plane network element identifier.

The third service processing policy message includes the second service flow forwarding identifier and a third service processing policy, and the third service processing policy is a policy for performing service processing on uplink packets or downlink packets of the user service flow by the second target forwarding plane network element.

The control plane network element 001 sends the third service processing policy message to the second target forwarding plane network element 0042. The third service processing policy message includes the second service flow forwarding identifier (IP1, TEID2) and the third service processing policy, and the third service processing policy is a policy for performing service processing on the uplink packets or downlink packets of the user service flow by the second target forwarding plane network element 0042. The third service processing policy message may be generated by the control plane network element 001 based on the preconfigured policy, or may be generated based on the second service flow forwarding identifier (IP1, TEID2), or may be generated based on the IP address of the UE. This is not limited in this embodiment of the present invention. Processing such as QoS control, online or offline charging, DPI, cache, lawful interception, TCP acceleration, HTTP header enrichment, and packet forwarding processing operations may be performed on the packets according to the third service processing policy.

Step 533: The control plane network element sends a first modification request message including the second target forwarding plane network element identifier and the second service flow forwarding identifier to the infrastructure controller.

The first modification request message is used to instruct the infrastructure controller to determine a second forwarding rule including the second target forwarding plane network element identifier and the second service flow forwarding identifier and send the second forwarding rule to the infrastructure forwarder.

The control plane network element 001 sends a notification message to the infrastructure controller 002, namely, the first modification request message including an identifier of the second forwarding plane network element 0042 and the second service flow forwarding identifier (IP1, TEID2), so as to notify the infrastructure controller 002 that the forwarding identifier corresponding to the user service flow has changed.

Step 534: The infrastructure controller determines a second forwarding rule according to the first modification request message.

The second forwarding rule includes the second target forwarding plane network element identifier and the second service flow forwarding identifier. The infrastructure controller 002 determines a new forwarding rule, namely, the second forwarding rule, according to the first modification request message. The second forwarding rule is used to instruct the infrastructure forwarder 003 controlled by the infrastructure controller 002 to perform forwarding processing on the packets according to the second forwarding rule.

Step 535: The infrastructure controller sends the second forwarding rule to the infrastructure forwarder.

The infrastructure controller 002 sends the second forwarding rule to the infrastructure forwarder 003, so that the infrastructure forwarder 003 performs forwarding processing on the packets according to the second forwarding rule.

Step 536: The control plane network element sends an update request message to the BS.

The update request message includes the second service flow forwarding identifier, namely, (IP1, TEID2).

It should be noted that, a sequence of step 532, step 533, and step 536 may be adjusted properly. The sequence of step 532, step 533, and step 536 is not limited in this embodiment of the present invention.

Step 537: The BS sends an update response message to the control plane network element.

Optionally, the BS 005 may send, to the control plane network element 001, the update response message corresponding to the update request message.

Step 538: The control plane network element sends a service processing policy deletion message to the first target forwarding plane network element.

The service processing policy deletion message is used to instruct the first target forwarding plane network element to delete at least one of the first service processing policy message or the second service processing policy message.

Step 539: The first target forwarding plane network element sends a service processing policy deletion response message to the control plane network element.

Optionally, the first target forwarding plane network element may send the service processing policy deletion response message to the control plane network element.

By performing step 531 to step 539, when the forwarding identifier corresponding to the user service flow changes, for example, when the forwarding identifier needs to be modified, the control plane network element can notify the infrastructure controller of the change. In this way, configuration of an end-to-end forwarding rule is implemented.

It should be additionally noted that, after step 504, or after step 510, the method used in the implementation environment shown in FIG. 5-2 may further include the following steps, as shown in FIG. 5-4.

Step 541: The control plane network element sends a service processing policy deletion message to the first target forwarding plane network element.

The service processing policy deletion message is used to instruct the first target forwarding plane network element to delete at least one of the first service processing policy message or the second service processing policy message. Specifically, the service processing policy deletion message may be used to instruct the first target forwarding plane network element to delete the first service processing policy message; the service processing policy deletion message may also be used to instruct the first target forwarding plane network element to delete the second service processing policy message; or the service processing policy deletion message may be further used to instruct the first target forwarding plane network element to delete the first service processing policy message and the second service processing policy message. As shown in FIG. 5-2, the control plane network element 001 sends the service processing policy deletion message to the first forwarding plane network element 0041. There are a plurality of reasons for the control plane network element 001 to send the service processing policy deletion message: when the UE initiates a detach procedure, the control plane network element 001 may send the service processing policy deletion message; or when the UE initiates a PDN disconnection procedure, the control plane network element 001 may send the service processing policy deletion message. This is not limited in this embodiment of the present invention.

Step 542: The first target forwarding plane network element sends a service processing policy deletion response message to the control plane network element.

Optionally, the first target forwarding plane network element may send the service processing policy deletion response message to the control plane network element.

Step 543: The control plane network element sends a first deletion request message to the infrastructure controller.

The first deletion request message includes the first service flow forwarding identifier and the first target forwarding plane network element identifier. Optionally, the control plane network element may send the first deletion request message to the infrastructure controller, so that the infrastructure controller sends a forwarding rule deletion request message to the infrastructure forwarder according to the first deletion request message; or the infrastructure controller may directly send a forwarding rule deletion request message to the infrastructure forwarder according to a preset rule. As shown in FIG. 5-2, the control plane network element 001 may send a notification message, namely, the first deletion request message, to the infrastructure controller 002. The first deletion request message may be used to notify the infrastructure controller 002 that the UE initiates a PDN disconnection or detach request. The first deletion request message includes the first service flow forwarding identifier (IP1, TEID1).

Step 544: The infrastructure controller sends a forwarding rule deletion request message to the infrastructure forwarder according to the first deletion request message.

The forwarding rule deletion request message is used to instruct the infrastructure forwarder to delete the first forwarding rule. The infrastructure controller 002 sends the forwarding rule deletion request message including the first service flow forwarding identifier (IP1, TEID1) to the infrastructure forwarder 003 according to the first deletion request message. The forwarding rule deletion request message may be used to instruct the infrastructure forwarder 003 to delete the first forwarding rule. The forwarding rule deletion request message may be a null or invalid forwarding rule, so that the infrastructure forwarder 003 replaces the first forwarding rule with the null or invalid forwarding rule.

Step 545: The control plane network element sends a second deletion request message to the BS.

The second deletion request message may include the first service flow forwarding identifier (IP1, TEID1), or may include a linked evolved packet system bearer identifier (LBI).

Step 546: The BS sends a second deletion response message to the control plane network element.

Optionally, the BS may send the second deletion response message to the control plane network element.

It should be noted that, a sequence of step 541, step 543, and step 545 may be adjusted properly. The sequence of step 541, step 543, and step 545 is not limited in this embodiment of the present invention.

By performing step 541 to step 546, when the forwarding identifier corresponding to the user service flow changes, for example, when the forwarding identifier needs to be deleted, the control plane network element can notify the infrastructure controller of the change. In this way, configuration of an end-to-end forwarding rule is implemented.

In summary, in the method for deploying a service flow forwarding function according to this embodiment of the present invention, the infrastructure controller can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figures 1A, 6:
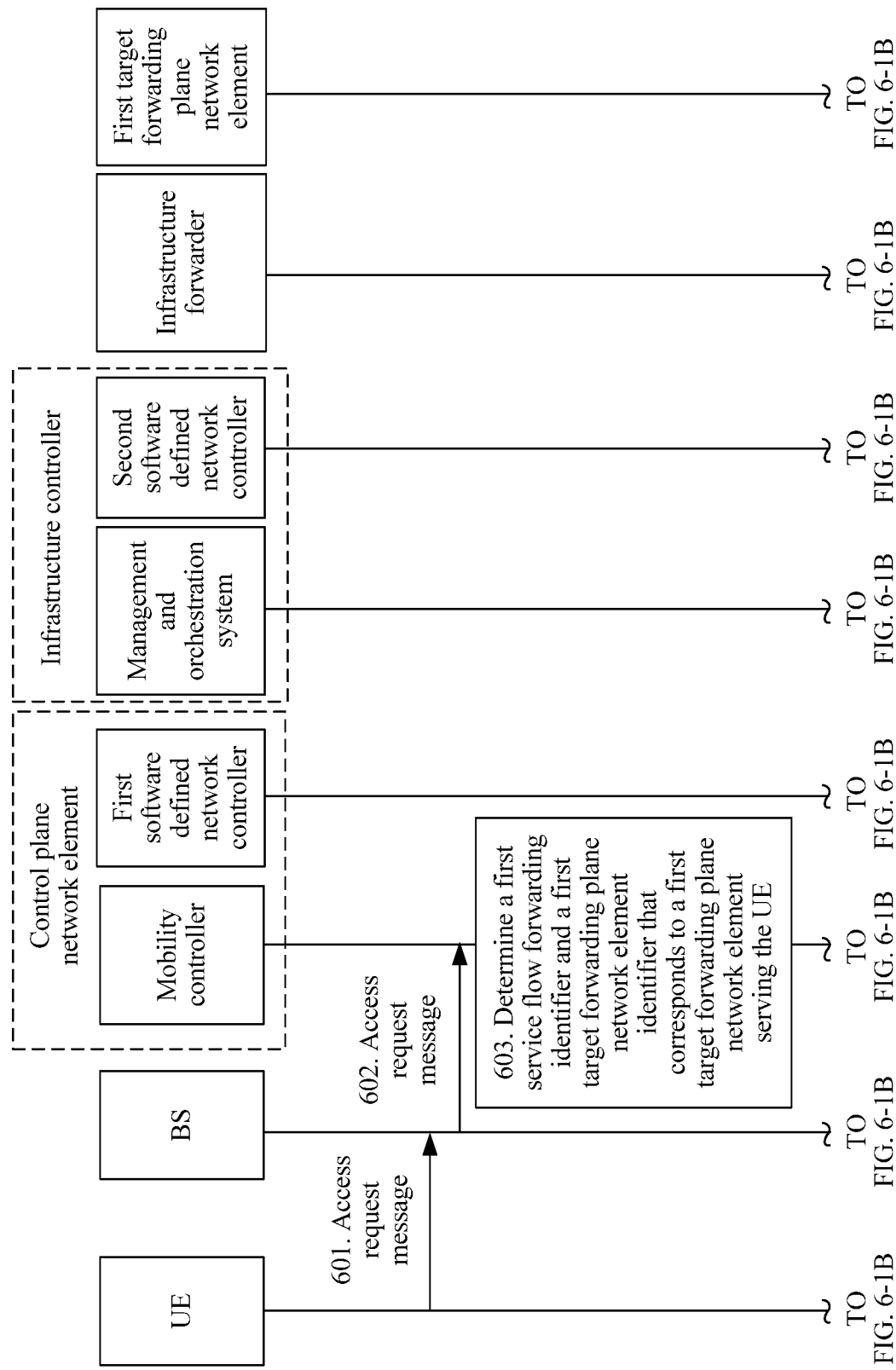
Figures 2, 6:
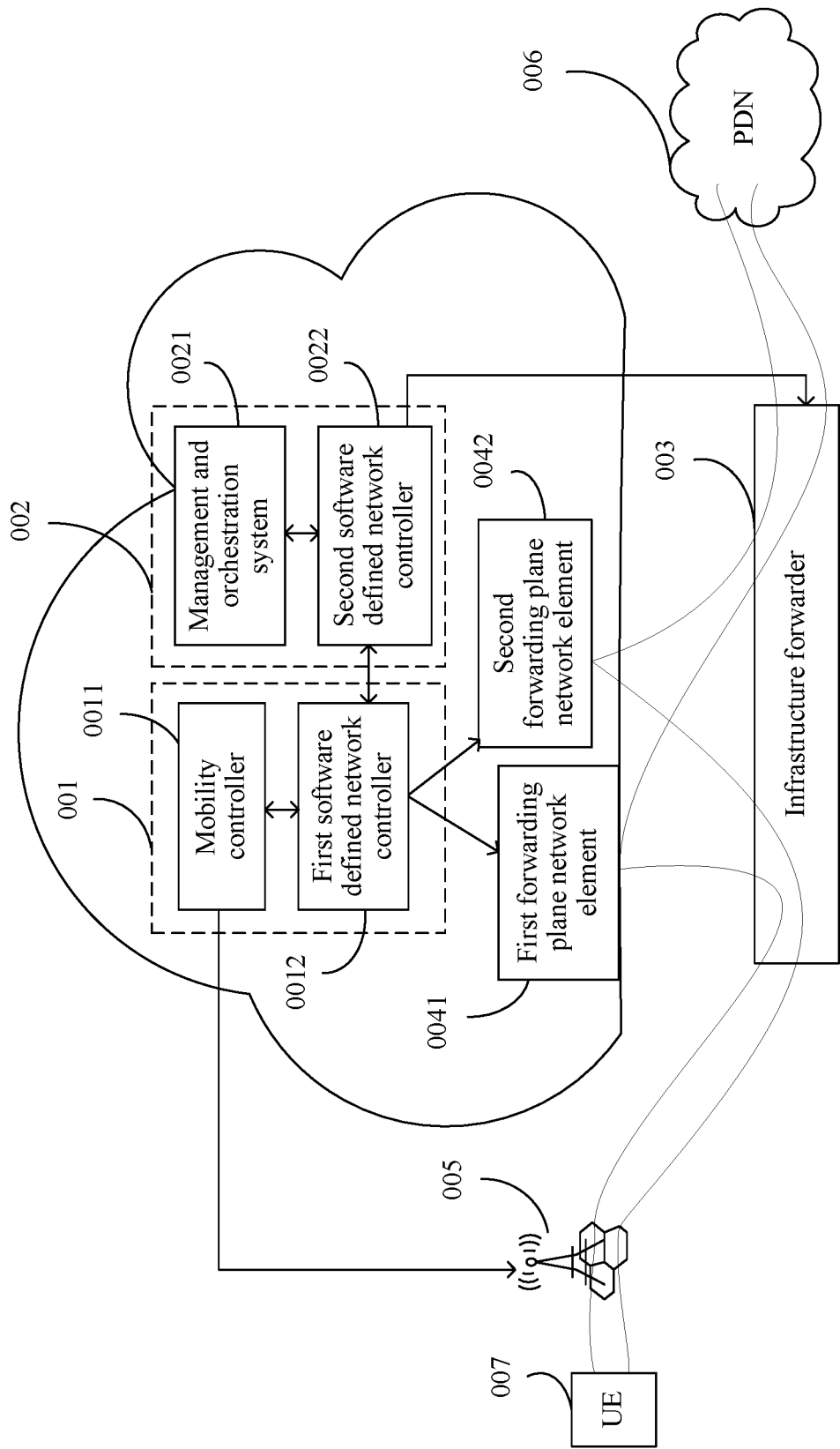

FIG. 6-1A and FIG. 6-1B are a flowchart of a method for deploying a service flow forwarding function according to an embodiment of the present invention. The method may be used in an implementation environment shown in FIG. 6-2. As shown in FIG. 6-2, a control plane network element 001 includes a mobility controller 0011 and a first software defined network controller 0012, and an infrastructure controller 002 includes a management and orchestration system 0021 (namely, MANO) and a second software defined network controller 0022. At least one forwarding plane network element includes a first forwarding plane network element 0041 and a second forwarding plane network element 0042. 007 denotes UE. The mobility controller 0011 may be at least one of an MME or a GW-C (gateway control plane), and the mobility controller 0011 is configured to control a BS 005 and the first software defined network controller 0012. The at least one forwarding plane network element 004 is directly controlled by the first software defined network controller 0012. The management and orchestration system 0021 is configured to perform resource management and orchestration on a whole infrastructure network and the second software defined network controller 0022. An infrastructure forwarder 003 is configured to forward packets between the BS 005 and the forwarding plane network element and forward packets between the forwarding plane network element and a PDN 006. This embodiment of the present invention is described by using an example in which a forwarding identifier corresponding to a user service flow is an IP quintuple of the user service flow.

As shown in FIG. 6-1A and FIG. 6-1B, the method may include the following steps.

Step 601: UE sends an access request message to a BS.

Step 602: The BS sends the access request message to a control plane network element.

The UE sends the access request message to the BS, and the BS sends the access request message to a mobility controller of the control plane network element.

Step 603: The control plane network element determines, by using a mobility controller, a first service flow forwarding identifier and a first target forwarding plane network element identifier that corresponds to a first target forwarding plane network element serving the UE.

As shown in FIG. 6-2, the mobility controller 0011 determines the first service flow forwarding identifier and the first target forwarding plane network element identifier that corresponds to the first target forwarding plane network element serving the UE. For example, the first target forwarding plane network element identifier may be a MAC address, or an IP address, or a port number of the first target forwarding plane network element; and the first service flow forwarding identifier may be an IP quintuple of a user service flow, denoted as (IP quintuple 1). The first target forwarding plane network element may be the first forwarding plane network element 0041. The IP quintuple may be determined by the mobility controller 0011 according to an IP address of the UE, that is, the IP quintuple may be determined by the mobility controller 0011 according to the IP address of the UE, or may be determined by the mobility controller 0011 according to a destination IP address, or may be determined by the mobility controller 0011 according to the IP address of the UE and a destination IP address. It should be noted that, specific content of the IP quintuple is not limited in this embodiment of the present invention. The specific content may include at least one of a source IP address, a source port number, a destination IP address, a destination port number, or a protocol number.

The first target forwarding plane network element may be determined according to a preconfigured policy of a user or according to current load of forwarding plane network elements. It should be noted that, the first service flow forwarding identifier may be determined by the control plane network element by using the mobility controller, or may be determined by the first target forwarding plane network element. For a specific process of determining the first service flow forwarding identifier by the first target forwarding plane network element, refer to step 503.

Step 604: The control plane network element sends a notification message to a first software defined network controller by using the mobility controller.

The control plane network element 001 sends the notification message to the first software defined network controller 0012 by using the mobility controller 0011, and the notification message includes the first service flow forwarding identifier (IP quintuple 1) and an identifier of the first forwarding plane network element 0041, so that the first software defined network controller 0012 sends the notification message to the infrastructure controller 002.

Step 605: The control plane network element sends, by using the first software defined network controller, a service processing policy message to the first target forwarding plane network element indicated by the first target forwarding plane network element identifier.

The control plane network element 001 sends the service processing policy message to the first target forwarding plane network element 0041 by using the first software defined network controller 0012. The service processing policy message includes the first service flow forwarding identifier and a service processing policy, and the service processing policy is a policy for performing service processing on packets of the user service flow by the first target forwarding plane network element. The service processing policy may be generated based on the preconfigured policy, or may be generated based on the first service flow forwarding identifier, or may be generated based on the IP address of the UE. This is not limited in this embodiment of the present invention. Processing such as QoS control, online or offline charging, DPI, cache, lawful interception, TCP acceleration, HTTP header enrichment, and packet forwarding processing operations may be performed on the packets according to the service processing policy.

Step 606: The control plane network element sends a notification message to a second software defined network controller of an infrastructure controller by using the first software defined network controller.

The control plane network element 001 sends the notification message to the second software defined network controller 0022 of the infrastructure controller 002 by using the first software defined network controller 0012. The notification message includes the first service flow forwarding identifier (IP quintuple 1) and the identifier of the first forwarding plane network element 0041.

A sequence of step 605 and step 606 may be adjusted properly. The sequence of step 605 and step 606 is not limited in this embodiment of the present invention.

Step 607: The infrastructure controller determines, according to the notification message by using the second software defined network controller, a first forwarding rule including the first service flow forwarding identifier and the first target forwarding plane network element identifier.

Specifically, the second software defined network controller 0022 determines, according to the notification message, the first forwarding rule including the first service flow forwarding identifier (IP quintuple 1) and the identifier of the first target forwarding plane network element 0041. The first forwarding rule is used to instruct the infrastructure forwarder 003 to perform forwarding processing on the packets according to the first forwarding rule.

Step 608: The infrastructure controller sends, by using the second software defined network controller, the first forwarding rule to an infrastructure forwarder controlled by the infrastructure controller.

The second software defined network controller 0022 of the infrastructure controller 002 sends the first forwarding rule determined in step 607 to the infrastructure forwarder 003 controlled by the infrastructure controller 002, so that the infrastructure forwarder 003 performs forwarding processing on the packets according to the first forwarding rule.

Step 609: The control plane network element sends a setup request message to the BS by using the mobility controller.

The control plane network element 001 sends the setup request message to the BS 005 by using the mobility controller 0011, and the setup request message includes the first service flow forwarding identifier (IP quintuple 1).

A sequence of step 604 and step 609 may be adjusted properly. The sequence of step 604 and step 609 is not limited in this embodiment of the present invention.

Step 610: The BS sends a setup response message to the mobility controller of the control plane network element.

Optionally, the BS 005 may send, to the mobility controller 0011 of the control plane network element 001, the setup response message in response to the setup request message.

Up to now, a connection between the UE and a PDN has been set up. When the packets of the user service flow need to be forwarded, as shown in FIG. 6-2, the UE 007 sends an uplink packet to the BS 005. The BS 005 sends the uplink packet to the infrastructure forwarder 003 according to a layer-2 (transport layer) or layer-3 (application layer) routing protocol; the infrastructure forwarder 003 forwards the uplink packet to the target forwarding plane network element according to an uplink packet forwarding rule; and then the target forwarding plane network element performs corresponding service processing on the uplink packet according to the service processing policy, and sends the processed uplink packet to the PDN 006 or a communications peer by using the infrastructure forwarder 003. The PDN 006 or the communications peer sends a downlink packet to the infrastructure forwarder 003; the infrastructure forwarder 003 sends the downlink packet to the target forwarding plane network element according to a downlink packet forwarding rule; then the target forwarding plane network element performs corresponding service processing on the downlink packet, and sends the processed downlink packet to the infrastructure forwarder 003; the infrastructure forwarder 003 forwards the processed downlink packet to the BS 005 according to the downlink packet forwarding rule; and then the BS 005 forwards the processed downlink packet to the UE 007.

In this embodiment of the present invention, by using an eastbound/westbound interface between software defined network controllers, the forwarding identifier corresponding to the user service flow is sent to the infrastructure controller, so that the second software defined network controller can determine the forwarding rule and deliver the forwarding rule to the infrastructure forwarder. In this way, configuration of an end-to-end forwarding rule is implemented.

It should be additionally noted that, likewise, when the forwarding identifier corresponding to the user service flow changes in this embodiment of the present invention, for example, when the forwarding identifier needs to be modified or deleted, the control plane network element can also notify the infrastructure controller of the change. In this way, configuration of an end-to-end forwarding rule is implemented. For a specific process, refer to step 531 to step 539 and step 541 to step 546 in the foregoing embodiment.

In summary, in the method for deploying a service flow forwarding function according to this embodiment of the present invention, the infrastructure controller can determine, according to the notification message sent by the control plane network element, the first forwarding rule including at least one forwarding identifier and an identifier of a target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figures 1, 7:
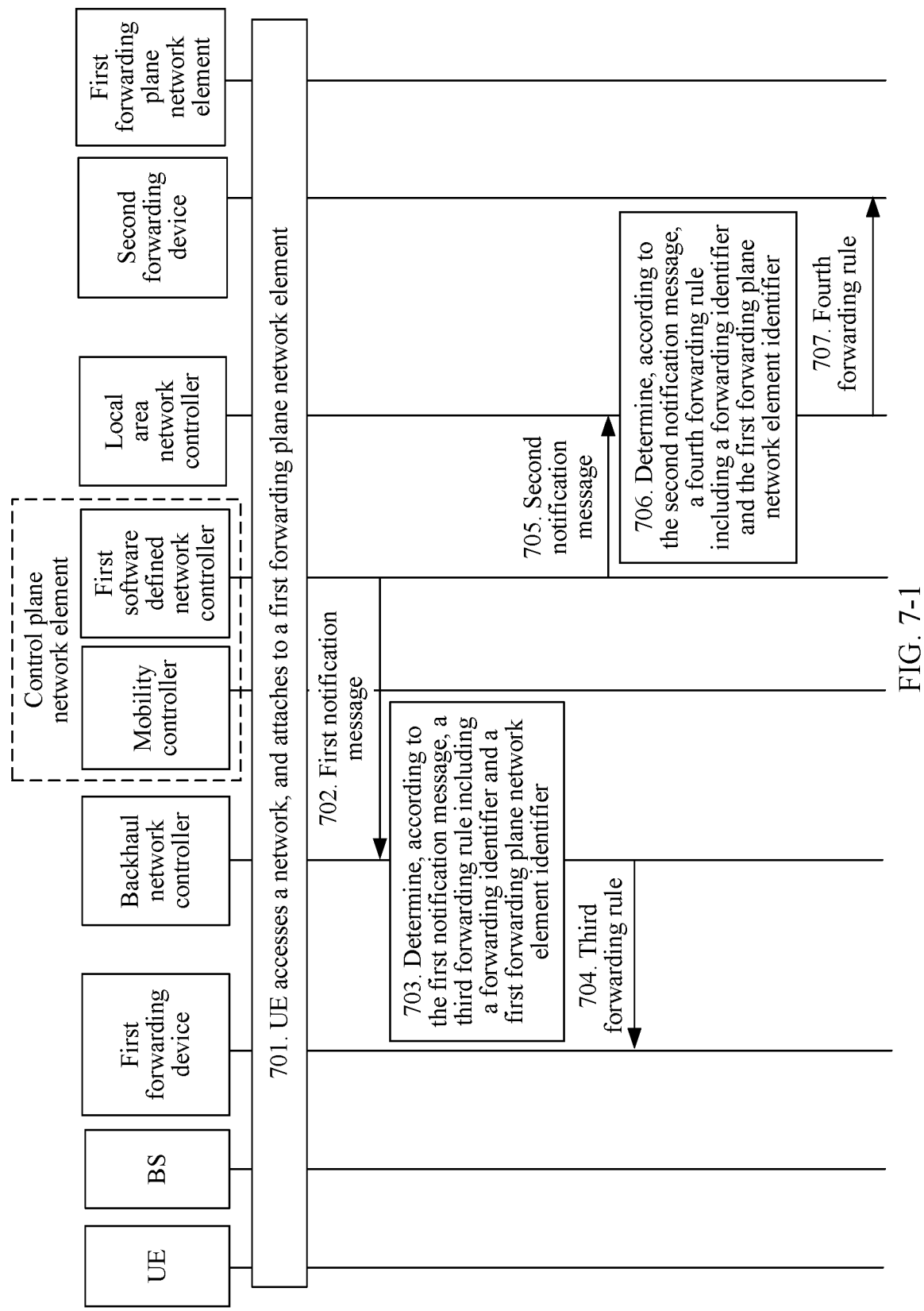
Figures 2, 7:
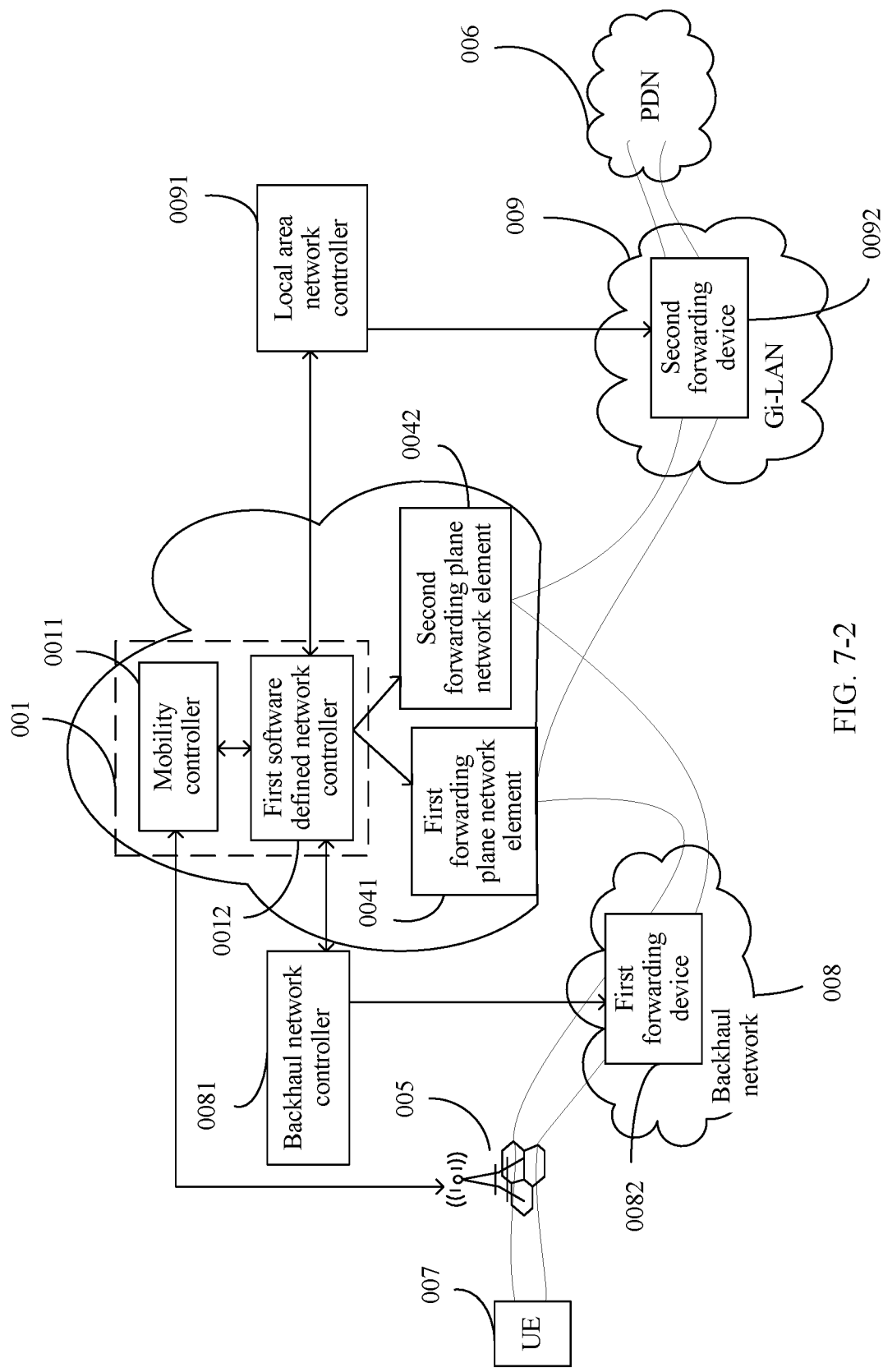

FIG. 7-1 is a flowchart of a method for deploying a service flow forwarding function according to an embodiment of the present invention. The method may be used in an implementation environment shown in FIG. 7-2. As shown in FIG. 7-2, a control plane network element 001 includes a mobility controller 0011 and a first software defined network controller 0012; the mobility controller 0011 may be at least one of an MME or a GW-C (gateway control plane); the mobility controller 0011 is configured to control a BS 005 and the software defined network controller 0012; and at least one forwarding plane network element is directly controlled by the first software defined network controller 0012. A backhaul network 008 is controlled by a backhaul network controller (Backhaul Controller) 0081. A Gi-LAN network 009 is controlled by a local area network controller (Gi-LAN controller) 0091. The at least one forwarding plane network element includes a first forwarding plane network element 0041 and a second forwarding plane network element 0042. 006 denotes a PDN, and 007 denotes UE. The backhaul network 008 includes a first forwarding device 0082 configured to forward packets. The Gi-LAN network 009 includes a second forwarding device 0092 configured to forward packets. The backhaul network 008 is a backhaul network between a radio access network and a core network. The first forwarding device 0082 is a network element for implementing packet forwarding in the backhaul network, for example, an SDN switch, a fixed network switch, or a router. The Gi-LAN network 009 is a network between the core network and the PDN. The second forwarding device 0092 is a network element for implementing packet forwarding in the Gi-LAN network, for example, an SDN switch, a fixed network switch, or a router.

This embodiment of the present invention is described by using an example in which a forwarding identifier corresponding to a user service flow, delivered by the control plane network element 001 to the backhaul network controller 0081 is (IP, TEID), and a forwarding identifier corresponding to the user service flow, delivered by the control plane network element 001 to the local area network controller 0091 is an IP quintuple of the user service flow.

As shown in FIG. 7-1, the method may include the following steps.

Step 701: UE accesses a network, and attaches to a first forwarding plane network element.

Specifically, the mobility controller 0011 determines a forwarding identifier (IP1, TEID1) of a user service flow, and notifies the first forwarding plane network element 0041 and the BS 005 of the forwarding identifier (IP1, TEID1). A message sent by the mobility controller 0011 to the first forwarding plane network element 0041 is forwarded by the first software defined network controller 0012, and the notification message includes the forwarding identifier (IP1, TEID1) and a service processing policy. The BS sends instruction information of the BS, namely, an IP address and a downlink TEID of the BS, to the first forwarding plane network element 0041, by using the mobility controller 0011 and the first software defined network controller 0012. For the process, refer to related descriptions in the foregoing embodiment. Details are not further described herein.

Step 702: A control plane network element sends a first notification message to a backhaul network controller by using a first software defined network controller.

The control plane network element 001 sends the first notification message to the backhaul network controller 0081 by using the first software defined network controller 0012. The first notification message includes the forwarding identifier (IP1, TEID1) and an identifier of the first forwarding plane network element 0041.

Step 703: The backhaul network controller determines, according to the first notification message, a third forwarding rule including a forwarding identifier and a first forwarding plane network element identifier.

The third forwarding rule is used to instruct the first forwarding device 0082 to perform forwarding processing on packets according to the third forwarding rule.

Step 704: The backhaul network controller sends the third forwarding rule to a first forwarding device.

The backhaul network controller 0081 sends the third forwarding rule determined in step 703 to the first forwarding device 0082, so that the first forwarding device 0082 performs forwarding processing on the packets according to the third forwarding rule.

Step 705: The control plane network element sends a second notification message to a local area network controller by using the first software defined network controller.

The control plane network element 001 sends the second notification message to the local area network controller 0091 by using the first software defined network controller 0012. The second notification message includes a forwarding identifier (IP quintuple) and the identifier of the first forwarding plane network element 0041. The IP quintuple may be determined by the mobility controller 0011 or the first software defined network controller 0012 according to an IP address of the UE.

Step 706: The local area network controller determines, according to the second notification message, a fourth forwarding rule including a forwarding identifier and the first forwarding plane network element identifier.

The fourth forwarding rule is used to instruct the second forwarding device 0092 to perform forwarding processing on the packets according to the fourth forwarding rule.

Step 707: The local area network controller sends the fourth forwarding rule to a second forwarding device.

The local area network controller 0091 sends the fourth forwarding rule determined in step 706 to the second forwarding device 0092, so that the second forwarding device 0092 performs forwarding processing on the packets according to the fourth forwarding rule.

It should be noted that, a sequence of step 702 and step 705 may be adjusted properly. The sequence of step 702 and step 705 is not limited in this embodiment of the present invention.

Up to now, a connection between the UE and a PDN has been set up. When the packets of the user service flow need to be forwarded, as shown in FIG. 7-2, the UE 007 sends an uplink packet to the BS 005; the BS 005 adds a first service flow forwarding identifier to the uplink packet; and subsequently, matching may be performed according to the service processing policy and a forwarding rule corresponding to the first service flow forwarding identifier. The BS 005 sends the uplink packet to the first forwarding device 0082; the first forwarding device 0082 sends the uplink packet to the first forwarding plane network element 0041 according to the third forwarding rule; the first forwarding plane network element 0041 performs corresponding service processing on the uplink packet according to the service processing policy, and sends the processed uplink packet to the second forwarding device 0092; the second forwarding device 0092 forwards the processed uplink packet according to the fourth forwarding rule; and finally, the processed uplink packet is sent to the PDN 006 or a communications peer. The PDN 006 or the communications peer sends a downlink packet to the second forwarding device 0092; the second forwarding device 0092 forwards the downlink packet to the first forwarding plane network element 0041 according to the fourth forwarding rule; the first forwarding plane network element 0041 performs corresponding service processing on the downlink packet according to the service processing policy, and sends the processed downlink packet to the first forwarding device 0082; then the first forwarding device 0082 forwards the processed downlink packet according to the third forwarding rule; and finally, the processed downlink packet is sent to the BS 005, and then the BS 005 sends the processed downlink packet to the UE 007.

This embodiment of the present invention is implemented based on separation of the control plane network element in the backhaul network and the control plane network element in the Gi-LAN network. Configuration of an end-to-end forwarding rule is implemented through interaction between the controller, namely, the first software defined network controller, of the first forwarding plane network element, and the backhaul network controller and the local area network controller.

It should be additionally noted that, likewise, when the forwarding identifier corresponding to the user service flow changes in this embodiment of the present invention, for example, when the forwarding identifier needs to be modified or deleted, the control plane network element can also notify an infrastructure controller of the change. In this way, configuration of an end-to-end forwarding rule is implemented. For a specific process, refer to step 531 to step 539 and step 541 to step 546 in the foregoing embodiment.

In summary, in the method for deploying a service flow forwarding function according to this embodiment of the present invention, the infrastructure controller can determine, according to the notification message sent by the control plane network element, the first forwarding rule including at least one forwarding identifier and an identifier of a target forwarding plane network element, and send the first forwarding rule to an infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figure 8:
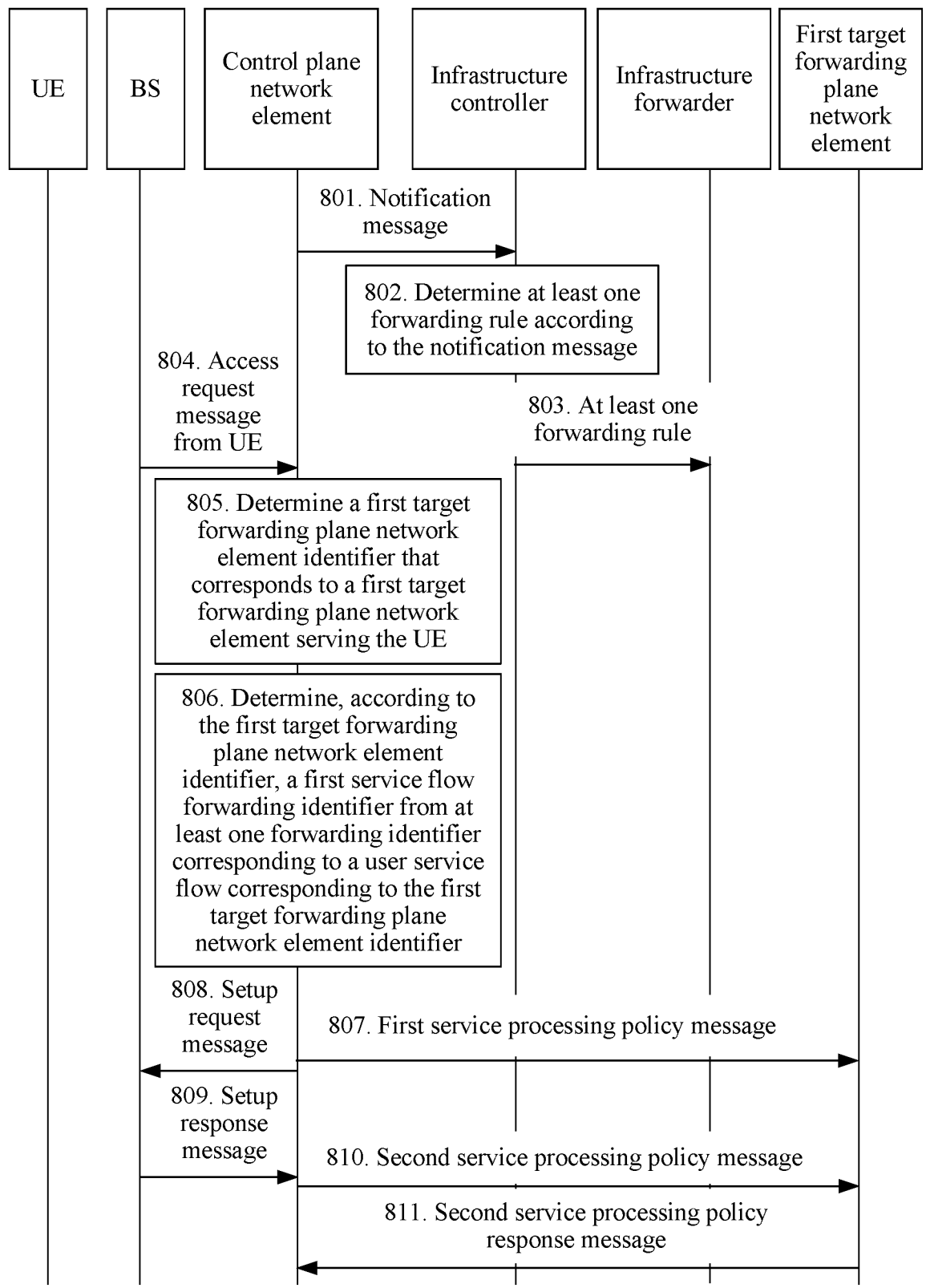
FIG. 8 is a flowchart of a method for deploying a service flow forwarding function according to an embodiment of the present invention.

FIG. 8 is a flowchart of a method for deploying a service flow forwarding function according to an embodiment of the present invention. The method may be used in the implementation environment shown in FIG. 5-2. In this embodiment of the present invention, a control plane network element 001 predetermines a forwarding identifier segment corresponding to a user service flow, and notifies an infrastructure controller 002 of the forwarding identifier segment. The infrastructure controller 002 determines, according to the forwarding identifier segment, a forwarding rule used for packet forwarding. In this way, configuration of an end-to-end forwarding rule is implemented. When UE 007 attaches to a first forwarding plane network element 0041, the control plane network element 001 selects a forwarding identifier from the predetermined forwarding identifier segment, as a forwarding identifier corresponding to the user service flow, and notifies a BS 005 and the first forwarding plane network element 0041 of the forwarding identifier.

As shown in FIG. 8, the method may include the following steps.

Step 801: A control plane network element sends a notification message to an infrastructure controller.

The notification message includes a forwarding identifier segment predetermined for a user service flow. A quantity of forwarding identifier segments is greater than or equal to 1, and each forwarding identifier segment corresponds to a forwarding plane network element identifier. For example, the forwarding identifier segment may be IP1 to IPn (n is greater than or equal to 1) of a forwarding plane network element, or may be (IP1, TEID1) to (IP1, TEIDn) of a forwarding plane network element, or may be (IP1, port number 1) to (IP1, port number n) of UE, or may be (IP1, MAC address 1) to (IP1, MAC address n) of a forwarding plane network element. This embodiment of the present invention is described by using an example in which the forwarding identifier segment is (IP1, TEID1) to (IP1, TEIDn).

Step 802: The infrastructure controller determines at least one forwarding rule according to the notification message.

The infrastructure controller determines, according to at least one forwarding identifier segment in the notification message, a forwarding rule corresponding to each forwarding identifier segment, where each forwarding rule corresponds to a forwarding plane network element identifier.

Step 803: The infrastructure controller sends the at least one forwarding rule to an infrastructure forwarder controlled by the infrastructure controller.

The infrastructure controller sends the at least one forwarding rule to the infrastructure forwarder controlled by the infrastructure controller, so that the infrastructure forwarder determines a corresponding forwarding rule according to a forwarding identifier included in the user service flow and performs forwarding processing on packets of the user service flow according to the corresponding forwarding rule.

Step 804: The control plane network element receives an access request message from UE.

This step may specifically include: the UE sends the access request message to a BS, and the control plane network element receives the access request message sent by the BS.

Step 805: The control plane network element determines a first target forwarding plane network element identifier that corresponds to a first target forwarding plane network element serving the UE.

For example, the control plane network element determines that the first target forwarding plane network element serving the UE is a first forwarding plane network element, and an identifier of the first forwarding plane network element is 0041. The first target forwarding plane network element may be determined according to a preconfigured policy of a user or according to current load of forwarding plane network elements.

Step 806: The control plane network element determines, according to the first target forwarding plane network element identifier, a first service flow forwarding identifier from at least one forwarding identifier corresponding to a user service flow corresponding to the first target forwarding plane network element identifier.

For example, the control plane network element determines, according to the identifier of the first forwarding plane network element 0041, a forwarding identifier segment corresponding to the identifier of the first forwarding plane network element 0041. It is assumed that the forwarding identifier segment is a forwarding identifier segment 1: (IP1, TEID1) to (IP1, TEIDn). Then the control plane network element selects, from the forwarding identifier segment 1, a forwarding identifier, for example, (IP1, TEID1), as the first service flow forwarding identifier. The forwarding identifier may be selected randomly, or may be selected according to a preset rule. This is not limited in this embodiment of the present invention.

Step 807: The control plane network element sends a first service processing policy message to the first target forwarding plane network element indicated by the first target forwarding plane network element identifier.

The first service processing policy message includes the first service flow forwarding identifier (IP1, TEID1) and a first service processing policy, and the first service processing policy is a policy for performing service processing on packets of the user service flow by the first target forwarding plane network element, namely, the first forwarding plane network element 0041. The first service processing policy message may carry a policy for performing service processing on uplink packets. The first service processing policy message may be generated based on the preconfigured policy, or may be generated based on the first service flow forwarding identifier, or may be generated based on an IP address of the UE. This is not limited in this embodiment of the present invention.

Step 808: The control plane network element sends a setup request message to a BS accessed by the UE.

The setup request message includes the first service flow forwarding identifier (IP1, TEID1).

Step 809: The BS sends a setup response message to the control plane network element.

Instruction information of the BS may be an IP address and a downlink TEID of the BS.

A sequence of step 807 and step 808 may be adjusted properly. The sequence of step 807 and step 808 is not limited in this embodiment of the present invention.

Step 810: The control plane network element sends, according to instruction information of the base station, a second service processing policy message to the first target forwarding plane network element indicated by the first target forwarding plane network element identifier.

The second service processing policy message includes the instruction information of the base station and a second service processing policy, and the second service processing policy is a policy for performing service processing on downlink packets of the user service flow by the first target forwarding plane network element.

Step 811: The first target forwarding plane network element sends a second service processing policy response message to the control plane network element.

Optionally, the first target forwarding plane network element may send the second service processing policy response message to the control plane network element.

Up to now, a connection between the UE and a PDN has been set up. When the packets of the user service flow need to be forwarded, as shown in FIG. 5-2, the UE 007 sends an uplink packet to the BS 005; the BS 005 adds the first service flow forwarding identifier to the uplink packet; and subsequently, matching may be performed according to the service processing policy and a forwarding rule corresponding to the first service flow forwarding identifier. The BS 005 sends the uplink packet to the infrastructure forwarder 003 according to a layer-2 (transport layer) or layer-3 (application layer) routing protocol; the infrastructure forwarder 003 forwards the uplink packet to the target forwarding plane network element, namely, the first forwarding plane network element 0041, according to an uplink packet forwarding rule; and then the target forwarding plane network element performs corresponding service processing on the uplink packet according to the first service processing policy, and sends the processed uplink packet to a PDN 006 or a communications peer. The PDN 006 or the communications peer sends a downlink packet to the target forwarding plane network element; then the target forwarding plane network element performs corresponding service processing on the downlink packet according to the second service processing policy, and sends the processed downlink packet to the infrastructure forwarder 003; the infrastructure forwarder 003 forwards the processed downlink packet to the BS 005 according to a downlink packet forwarding rule; and then the BS 005 sends the processed downlink packet to the UE 007.

In this embodiment of the present invention, the control plane network element predetermines the forwarding identifier segment corresponding to the user service flow, and interacts with the infrastructure controller so that the infrastructure forwarder preconfigures a packet forwarding rule. When the UE 007 attaches to the forwarding plane network element, the control plane network element selects, from the predetermined forwarding identifier segment, a forwarding identifier as a forwarding identifier corresponding to the user service flow, and notifies the forwarding plane network element of the forwarding identifier, so that the forwarding plane network element can perform service processing on the packets of the user service flow according to the forwarding identifier. In this way, configuration of an end-to-end forwarding rule is implemented.

In summary, in the method for deploying a service flow forwarding function according to this embodiment of the present invention, the infrastructure controller can determine, according to the notification message sent by the control plane network element, a first forwarding rule including at least one forwarding identifier and an identifier of a target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

It should be noted that, a sequence of steps in the method for deploying a service flow forwarding function according to this embodiment of the present invention may be adjusted properly, and steps may also be added or removed correspondingly according to a situation. Any variation readily figured out by a person skilled in the art within the technical scope disclosed in the present invention shall fall within the protection scope of the present invention, and details are not described herein.

Figures 1, 9:
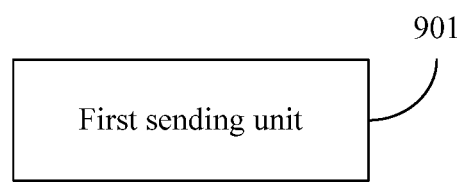
Figures 2, 9:
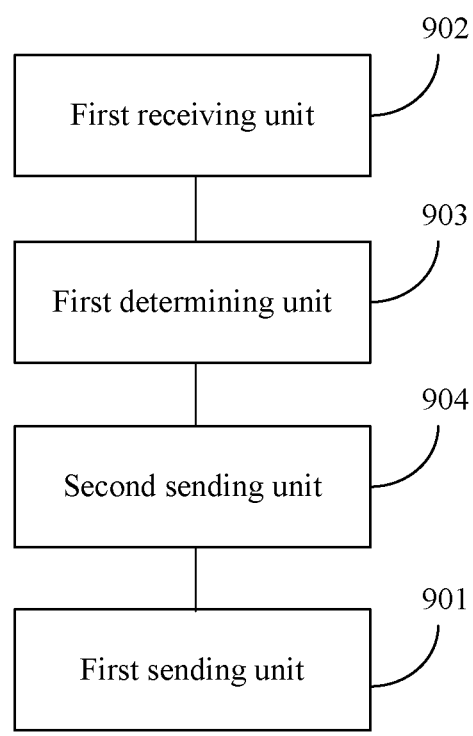
Figures 3, 9:
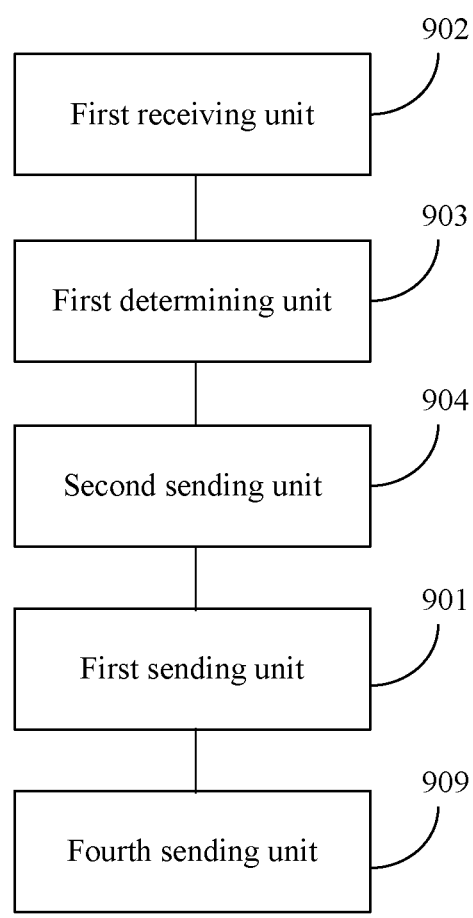
Figures 4, 9:
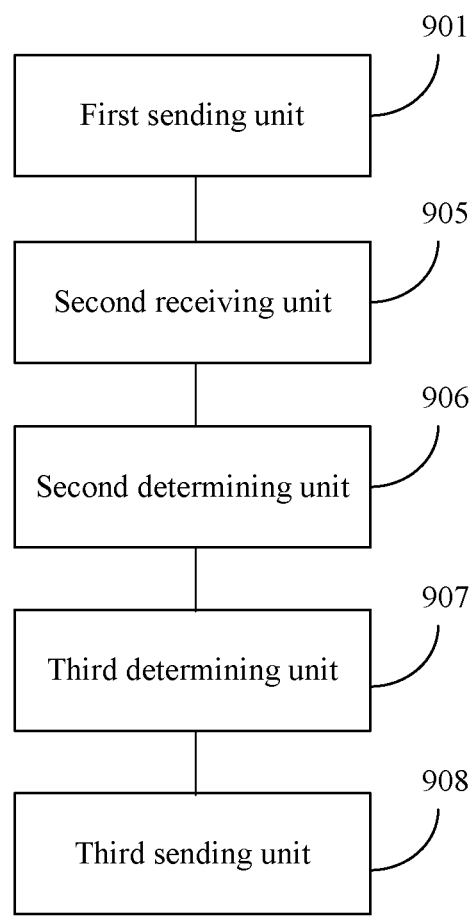
Figures 5, 9:
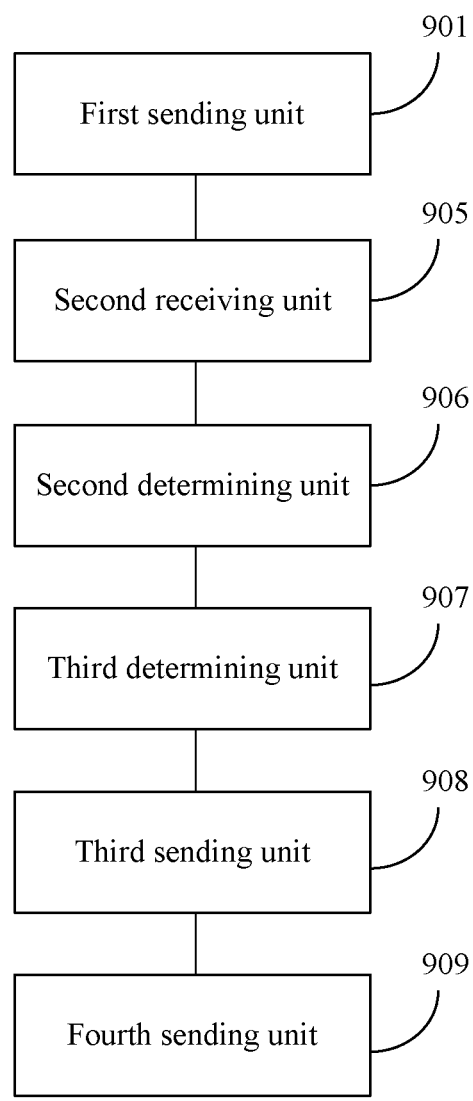
Figures 6, 9:
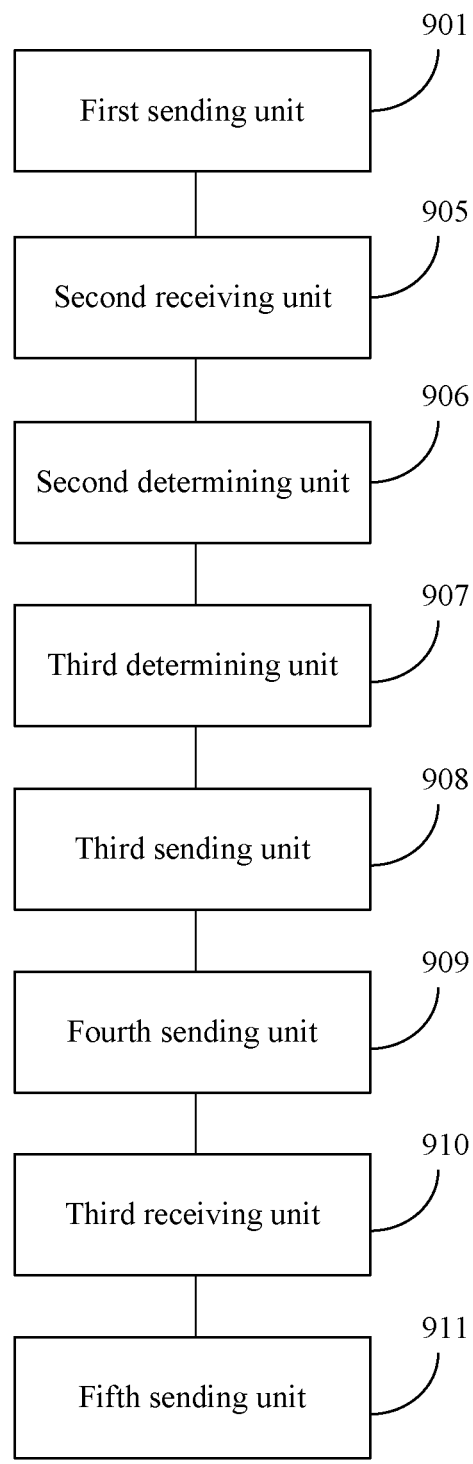
Figures 7, 9:
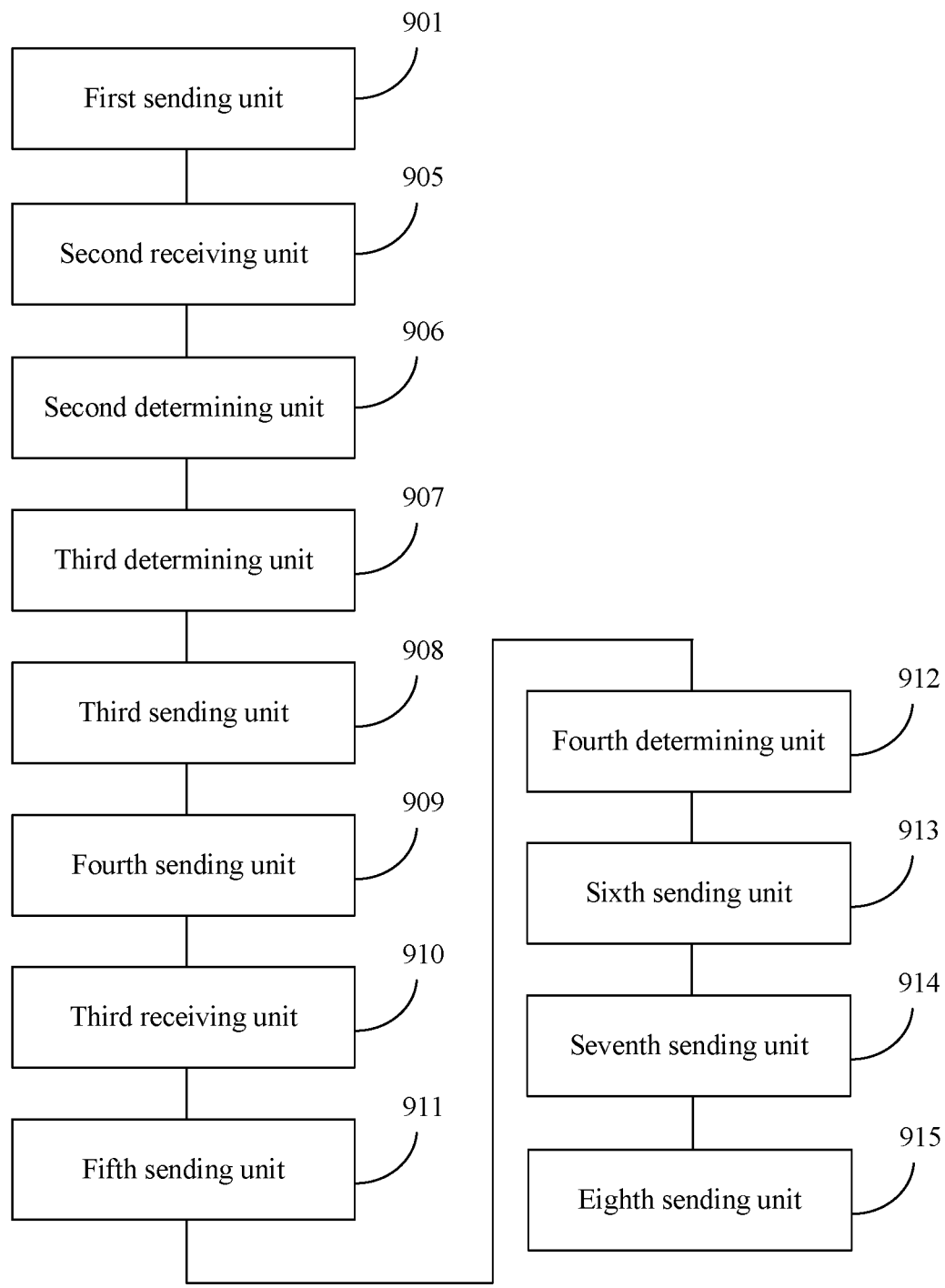
Figures 8, 9:
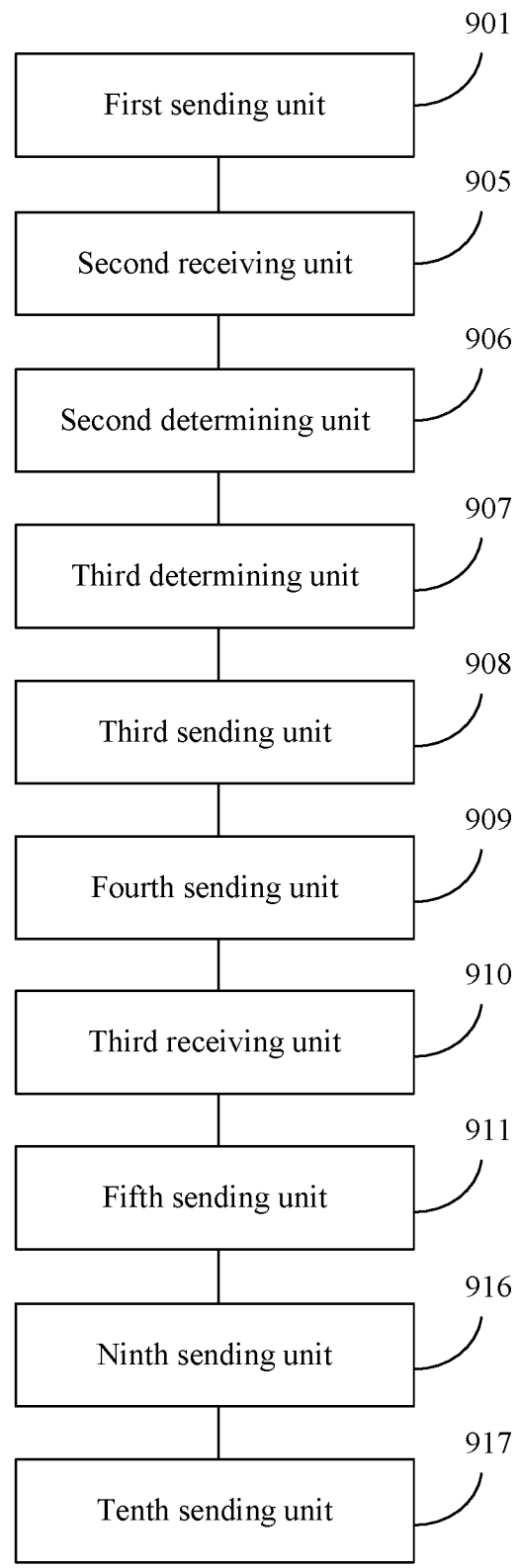

An embodiment of the present invention provides an apparatus for deploying a service flow forwarding function, where the apparatus is applied to a control plane network element. As shown in FIG. 9-1, the apparatus may include:

a first sending unit 901, configured to send a notification message to an infrastructure controller, where the notification message includes at least one forwarding identifier corresponding to a user service flow and includes an identifier of a target forwarding plane network element providing service processing for the user service flow; where the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller.

In summary, the apparatus for deploying a service flow forwarding function according to this embodiment of the present invention can send the notification message to the infrastructure controller, and the notification message is used to instruct the infrastructure controller to determine the first forwarding rule including the at least one forwarding identifier and the identifier of the target forwarding plane network element and send the first forwarding rule to the infrastructure forwarder controlled by the infrastructure controller. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Optionally, after the apparatus for deploying a service flow forwarding function determines a first target forwarding plane network element serving UE, the at least one forwarding identifier corresponding to the user service flow is determined by the first target forwarding plane network element.

An embodiment of the present invention provides another apparatus for deploying a service flow forwarding function. As shown in FIG. 9-2, the apparatus may include:
- a first sending unit 901, configured to send a notification message to an infrastructure controller, where the notification message includes at least one forwarding identifier corresponding to a user service flow and includes an identifier of a target forwarding plane network element providing service processing for the user service flow;
- a first receiving unit 902, configured to receive an access request message from UE;
- a first determining unit 903, configured to determine a first service flow forwarding identifier and a first target forwarding plane network element identifier that corresponds to a first target forwarding plane network element serving the UE; and
- a second sending unit 904, configured to send a first service processing policy message to the first target forwarding plane network element indicated by the first target forwarding plane network element identifier, where the first service processing policy message includes the first service flow forwarding identifier and a first service processing policy, and the first service processing policy is a policy for performing service processing on packets of the user service flow by the first target forwarding plane network element.

Optionally, as shown in FIG. 9-3, the apparatus for deploying a service flow forwarding function may further include:
- a fourth sending unit 909, configured to send a setup request message to a base station accessed by the UE, where the setup request message includes the first service flow forwarding identifier.

An embodiment of the present invention provides still another apparatus for deploying a service flow forwarding function. As shown in FIG. 9-4, the apparatus may include:
- a first sending unit 901, configured to send a notification message to an infrastructure controller, where the notification message includes at least one forwarding identifier corresponding to a user service flow and includes an identifier of a target forwarding plane network element providing service processing for the user service flow;
- a second receiving unit 905, configured to receive an access request message from UE;
- a second determining unit 906, configured to determine a first target forwarding plane network element identifier that corresponds to a first target forwarding plane network element serving the UE;
- a third determining unit 907, configured to determine, according to the first target forwarding plane network element identifier, a first service flow forwarding identifier from the at least one forwarding identifier corresponding to the user service flow corresponding to the first target forwarding plane network element identifier; and
- a third sending unit 908, configured to send a first service processing policy message to the first target forwarding plane network element indicated by the first target forwarding plane network element identifier, where the first service processing policy message includes the first service flow forwarding identifier and a first service processing policy, and the first service processing policy is a policy for performing service processing on packets of the user service flow by the first target forwarding plane network element.

Optionally, as shown in FIG. 9-5, the apparatus for deploying a service flow forwarding function may further include:
- a fourth sending unit 909, configured to send a setup request message to a base station accessed by the UE, where the setup request message includes the first service flow forwarding identifier.

As shown in FIG. 9-6, the apparatus may further include:
- a third receiving unit 910, configured to receive a setup response message sent by the base station, where the setup response message includes instruction information of the base station; and
- a fifth sending unit 911, configured to send, according to the instruction information of the base station, a second service processing policy message to the first target forwarding plane network element indicated by the first target forwarding plane network element identifier, where the second service processing policy message includes the instruction information of the base station and a second service processing policy, and the second service processing policy is a policy for performing service processing on downlink packets of the user service flow by the first target forwarding plane network element.

Optionally, as shown in FIG. 9-7, the apparatus may further include:
- a fourth determining unit 912, configured to determine a second service flow forwarding identifier and a second target forwarding plane network element identifier corresponding to a second target forwarding plane network element serving the UE;
- a sixth sending unit 913, configured to send a third service processing policy message to the second target forwarding plane network element indicated by the second target forwarding plane network element identifier, where the third service processing policy message includes the second service flow forwarding identifier and a third service processing policy, and the third service processing policy is a policy for performing service processing on uplink packets or downlink packets of the user service flow by the second target forwarding plane network element;
- a seventh sending unit 914, configured to send a first modification request message including the second target forwarding plane network element identifier and the second service flow forwarding identifier to the infrastructure controller, where the first modification request message is used to instruct the infrastructure controller to determine a second forwarding rule including the second target forwarding plane network element identifier and the second service flow forwarding identifier and send the second forwarding rule to the infrastructure forwarder; and
- an eighth sending unit 915, configured to send an update request message to the base station, where the update request message includes the second service flow forwarding identifier.

An embodiment of the present invention provides yet another apparatus for deploying a service flow forwarding function. As shown in FIG. 9-8, the apparatus may include:
- a ninth sending unit 916, configured to send a service processing policy deletion message to a first target forwarding plane network element, where the service processing policy deletion message is used to instruct the first target forwarding plane network element to delete at least one of a first service processing policy message or a second service processing policy message; and a tenth sending unit 917, configured to send a first deletion request message to an infrastructure controller, where the first deletion request message includes a first service flow forwarding identifier and a first target forwarding plane network element identifier.

Optionally, the apparatus for deploying a service flow forwarding function includes a mobility controller and a first software defined network controller, and the first sending unit 901 is configured to:

send the notification message to the infrastructure controller by using the mobility controller and the first software defined network controller.

Optionally, each forwarding identifier in the at least one forwarding identifier is an IP address of a forwarding plane network element, or an IP address and a TEID of a forwarding plane network element, or an IP address of the UE, or an IP address and a port number of the UE, or an IP quintuple of the user service flow; and the identifier of the target forwarding plane network element is a MAC address of the forwarding plane network element, or an IP address of the forwarding plane network element, or a port number of the forwarding plane network element.

In summary, the apparatus for deploying a service flow forwarding function according to this embodiment of the present invention can send the notification message to the infrastructure controller, and the notification message is used to instruct the infrastructure controller to determine the first forwarding rule including the at least one forwarding identifier and the identifier of the target forwarding plane network element and send the first forwarding rule to the infrastructure forwarder controlled by the infrastructure controller. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figures 1, 10:
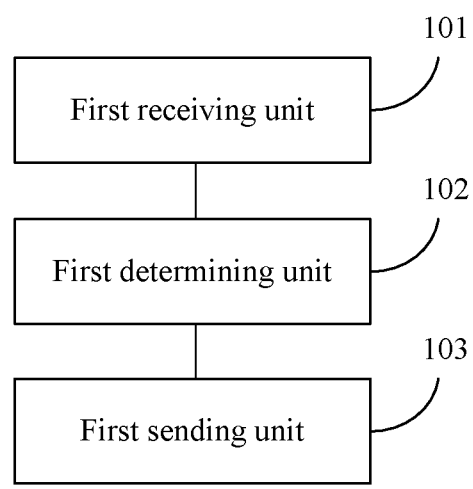
Figures 2, 10:
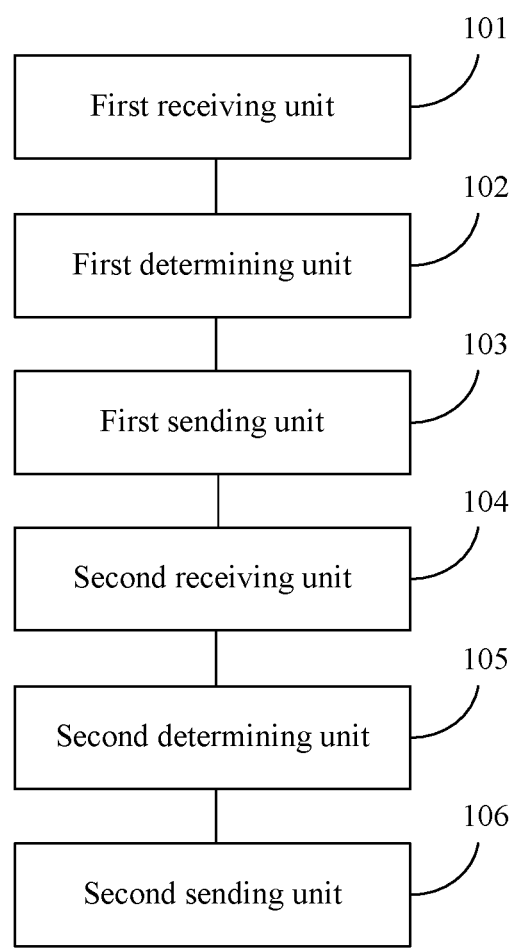
Figures 3, 10:
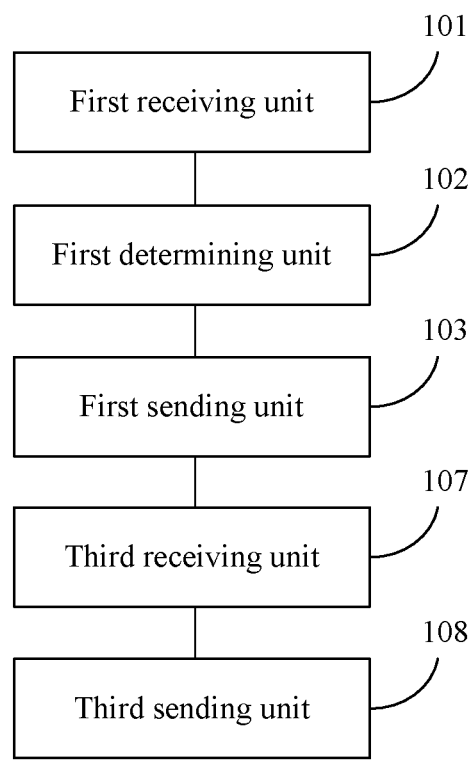

An embodiment of the present invention provides an apparatus for deploying a service flow forwarding function, where the apparatus is applied to an infrastructure controller. As shown in FIG. 10-1, the apparatus may include:

a first receiving unit 101, configured to receive a notification message sent by a control plane network element, where the notification message includes at least one forwarding identifier corresponding to a user service flow and includes an identifier of a target forwarding plane network element providing service processing for the user service flow;

a first determining unit 102, configured to determine, according to the notification message, a first forwarding rule including the at least one forwarding identifier and the identifier of the target forwarding plane network element, where the first forwarding rule is used to instruct to forward the user service flow; and a first sending unit 103, configured to send the first forwarding rule to an infrastructure forwarder controlled by the apparatus for deploying a service flow forwarding function.

In summary, the apparatus for deploying a service flow forwarding function according to this embodiment of the present invention can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Optionally, the at least one forwarding identifier corresponding to the user service flow is a first service flow forwarding identifier. As shown in FIG. 10-2, the apparatus may further include:

a second receiving unit 104, configured to receive a first modification request message including a second target forwarding plane network element identifier and a second service flow forwarding identifier and sent by the control plane network element, where the first modification request message is sent to the apparatus for deploying a service flow forwarding function after the control plane network element determines that a target forwarding plane network element serving UE changes, and the second target forwarding plane network element identifier and the second service flow forwarding identifier are determined by the control plane network element;

a second determining unit 105, configured to determine a second forwarding rule according to the first modification request message, where the second forwarding rule includes the second target forwarding plane network element identifier and the second service flow forwarding identifier; and a second sending unit 106, configured to send the second forwarding rule to the infrastructure forwarder.

An embodiment of the present invention provides another apparatus for deploying a service flow forwarding function. As shown in FIG. 10-3, the apparatus may include:

a first receiving unit 101, configured to receive a notification message sent by a control plane network element, where the notification message includes at least one forwarding identifier corresponding to a user service flow and includes an identifier of a target forwarding plane network element providing service processing for the user service flow;

a first determining unit 102, configured to determine, according to the notification message, a first forwarding rule including the at least one forwarding identifier and the identifier of the target forwarding plane network element, where the first forwarding rule is used to instruct to forward the user service flow;

a first sending unit 103, configured to send the first forwarding rule to an infrastructure forwarder controlled by the apparatus for deploying a service flow forwarding function;

a third receiving unit 107, configured to receive a first deletion request message sent by the control plane network element, where the first deletion request message includes a first service flow forwarding identifier and a first target forwarding plane network element identifier, and the first service flow forwarding identifier and the first target forwarding plane network element identifier are determined by the control plane network element after the control plane network element receives an access request message from user equipment UE; and a third sending unit 108, configured to send a forwarding rule deletion request message to the infrastructure forwarder according to the first deletion request message, where the forwarding rule deletion request message is used to instruct the infrastructure forwarder to delete the first forwarding rule.

Optionally, the apparatus for deploying a service flow forwarding function includes a management and orchestration system and a second software defined network controller, and the first receiving unit 101 is configured to:

receive, by using the second software defined network controller, the notification message sent by the control plane network element;

the first determining unit 102 is further configured to:

determine the first forwarding rule by using the second software defined network controller; and the first sending unit 103 is further configured to:

send the first forwarding rule to the infrastructure forwarder by using the second software defined network controller.

Optionally, each forwarding identifier in the at least one forwarding identifier is an IP address of a forwarding plane network element, or an IP address and a TEID of a forwarding plane network element, or an IP address of the UE, or an IP address and a port number of the UE, or an IP quintuple of the user service flow; and the identifier of the target forwarding plane network element is a MAC address of the forwarding plane network element, or an IP address of the forwarding plane network element, or a port number of the forwarding plane network element.

In summary, the apparatus for deploying a service flow forwarding function according to this embodiment of the present invention can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

For the apparatus in the foregoing embodiment, specific manners of performing operations by each unit are described in detail in the embodiments related to the method, and details are not described herein.

Figures 1, 11:
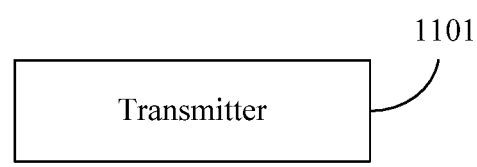
Figures 2, 11:
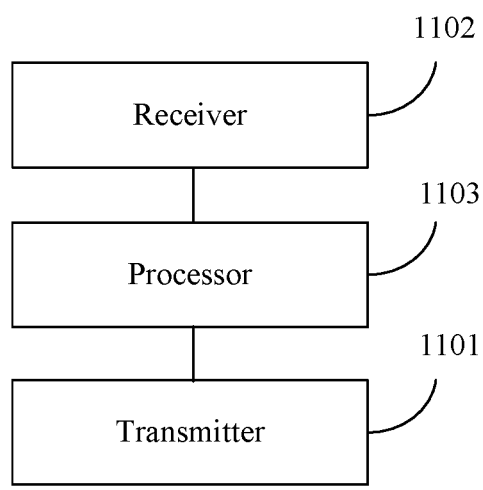

An embodiment of the present invention provides an apparatus for deploying a service flow forwarding function, where the apparatus is applied to a control plane network element. As shown in FIG. 11-1, the apparatus may include:

a transmitter 1101, configured to send a notification message to an infrastructure controller, where the notification message includes at least one forwarding identifier corresponding to a user service flow and includes an identifier of a target forwarding plane network element providing service processing for the user service flow; where the notification message is used to instruct the infrastructure controller to determine a first forwarding rule including the at least one forwarding identifier and the identifier of the target forwarding plane network element and send the first forwarding rule to an infrastructure forwarder controlled by the infrastructure controller.

Optionally, after the apparatus for deploying a service flow forwarding function determines a first target forwarding plane network element serving user equipment UE, the at least one forwarding identifier corresponding to the user service flow is determined by the first target forwarding plane network element.

Optionally, the at least one forwarding identifier corresponding to the user service flow is a first service flow forwarding identifier. As shown in FIG. 11-2, the apparatus may further include:

a receiver 1102, configured to receive an access request message from UE; and a processor 1103, configured to determine the first service flow forwarding identifier and a first target forwarding plane network element identifier that corresponds to a first target forwarding plane network element serving the UE; where the transmitter 1101 is further configured to send a first service processing policy message to the first target forwarding plane network element indicated by the first target forwarding plane network element identifier, where the first service processing policy message includes the first service flow forwarding identifier and a first service processing policy, and the first service processing policy is a policy for performing service processing on packets of the user service flow by the first target forwarding plane network element.

Optionally, the processor 1103 is further configured to determine the first target forwarding plane network element identifier that corresponds to the first target forwarding plane network element serving the UE; and determine, according to the first target forwarding plane network element identifier, the first service flow forwarding identifier from the at least one forwarding identifier corresponding to the user service flow corresponding to the first target forwarding plane network element identifier; and the transmitter 1101 is further configured to send a setup request message to a base station accessed by the UE, where the setup request message includes the first service flow forwarding identifier.

Optionally, the receiver 1102 is further configured to receive a setup response message sent by the base station, where the setup response message includes instruction information of the base station; and the transmitter 1101 is further configured to send, according to the instruction information of the base station, a second service processing policy message to the first target forwarding plane network element indicated by the first target forwarding plane network element identifier, where the second service processing policy message includes the instruction information of the base station and a second service processing policy, and the second service processing policy is a policy for performing service processing on downlink packets of the user service flow by the first target forwarding plane network element.

Optionally, the processor 1103 is further configured to determine a second service flow forwarding identifier and a second target forwarding plane network element identifier corresponding to a second target forwarding plane network element serving the UE;

the transmitter 1101 is further configured to send a third service processing policy message to the second target forwarding plane network element indicated by the second target forwarding plane network element identifier, where the third service processing policy message includes the second service flow forwarding identifier and a third service processing policy, and the third service processing policy is a policy for performing service processing on uplink packets or downlink packets of the user service flow by the second target forwarding plane network element; and the transmitter 1101 is further configured to send a first modification request message including the second target forwarding plane network element identifier and the second service flow forwarding identifier to the infrastructure controller, where the first modification request message is used to instruct the infrastructure controller to determine a second forwarding rule including the second target forwarding plane network element identifier and the second service flow forwarding identifier and send the second forwarding rule to the infrastructure forwarder.

Optionally, the transmitter 1101 is further configured to send an update request message to the base station, where the update request message includes the second service flow forwarding identifier.

Optionally, the transmitter 1101 is further configured to send a service processing policy deletion message to the first target forwarding plane network element, where the service processing policy deletion message is used to instruct the first target forwarding plane network element to delete at least one of the first service processing policy message or the second service processing policy message.

Optionally, the transmitter 1101 is further configured to send a first deletion request message to the infrastructure controller, where the first deletion request message includes the first service flow forwarding identifier and the first target forwarding plane network element identifier.

The apparatus for deploying a service flow forwarding function includes a mobility controller and a first software defined network controller, and the transmitter 1101 is configured to send the notification message to the infrastructure controller by using the mobility controller and the first software defined network controller.

Optionally, each forwarding identifier in the at least one forwarding identifier is an IP address of a forwarding plane network element, or an IP address and a TEID of a forwarding plane network element, or an IP address of the UE, or an IP address and a port number of the UE, or an IP quintuple of the user service flow; and the identifier of the target forwarding plane network element is a MAC address of the forwarding plane network element, or an IP address of the forwarding plane network element, or a port number of the forwarding plane network element.

In summary, the apparatus for deploying a service flow forwarding function according to this embodiment of the present invention can send the notification message to the infrastructure controller, and the notification message is used to instruct the infrastructure controller to determine the first forwarding rule including the at least one forwarding identifier and the identifier of the target forwarding plane network element and send the first forwarding rule to the infrastructure forwarder controlled by the infrastructure controller. In comparison with the prior art, in a network based on separation of control plane network elements, configuration of an end-to-end forwarding rule is implemented through interaction between the control plane network element and the infrastructure controller. Therefore, flexibility of service flow forwarding is improved.

Figure 12:
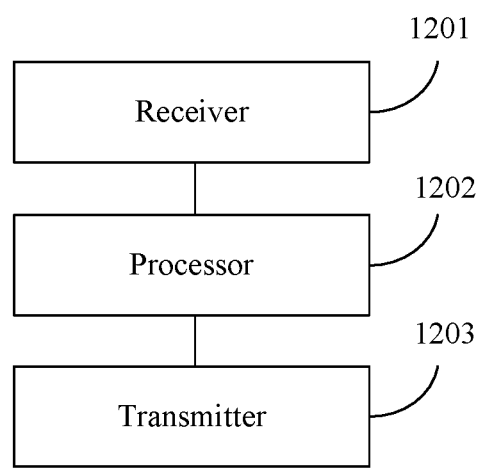
FIG. 12 is a block diagram of an apparatus for deploying a service flow forwarding function according to an embodiment of the present invention.

An embodiment of the present invention provides an apparatus for deploying a service flow forwarding function, where the apparatus is applied to an infrastructure controller. As shown in FIG. 12, the apparatus may include:

a receiver 1201, configured to receive a notification message sent by a control plane network element, where the notification message includes at least one forwarding identifier corresponding to a user service flow and includes an identifier of a target forwarding plane network element providing service processing for the user service flow;

a processor 1202, configured to determine, according to the notification message, a first forwarding rule including the at least one forwarding identifier and the identifier of the target forwarding plane network element, where the first forwarding rule is used to instruct to forward the user service flow; and a transmitter 1203, configured to send the first forwarding rule to an infrastructure forwarder controlled by the apparatus for deploying a service flow forwarding function.

Optionally, the at least one forwarding identifier corresponding to the user service flow is a first service flow forwarding identifier, and the receiver 1201 is further configured to receive a first modification request message including a second target forwarding plane network element identifier and a second service flow forwarding identifier and sent by the control plane network element, where the first modification request message is sent to the apparatus for deploying a service flow forwarding function after the control plane network element determines that a target forwarding plane network element serving UE changes, and the second target forwarding plane network element identifier and the second service flow forwarding identifier are determined by the control plane network element;

the processor 1202 is further configured to determine a second forwarding rule according to the first modification request message, where the second forwarding rule includes the second target forwarding plane network element identifier and the second service flow forwarding identifier; and the transmitter 1203 is further configured to send the second forwarding rule to the infrastructure forwarder.

Optionally, the receiver 1201 is further configured to receive a first deletion request message sent by the control plane network element, where the first deletion request message includes a first service flow forwarding identifier and a first target forwarding plane network element identifier, and the first service flow forwarding identifier and the first target forwarding plane network element identifier are determined by the control plane network element after the control plane network element receives an access request message from user equipment UE; and the transmitter 1203 is further configured to send a forwarding rule deletion request message to the infrastructure forwarder according to the first deletion request message, where the forwarding rule deletion request message is used to instruct the infrastructure forwarder to delete the first forwarding rule.

Optionally, the apparatus for deploying a service flow forwarding function includes a management and orchestration system and a second software defined network controller, and the receiver 1201 is configured to:

receive, by using the second software defined network controller, the notification message sent by the control plane network element;

the processor 1202 is further configured to:

determine the first forwarding rule by using the second software defined network controller; and the transmitter 1203 is further configured to:

send the first forwarding rule to the infrastructure forwarder by using the second software defined network controller.

Optionally, each forwarding identifier in the at least one forwarding identifier is an IP address of a forwarding plane network element, or an IP address and a TEID of a forwarding plane network element, or an IP address of the UE, or an IP address and a port number of the UE, or an IP quintuple of the user service flow; and the identifier of the target forwarding plane network element is a MAC address of the forwarding plane network element, or an IP address of the forwarding plane network element, or a port number of the forwarding plane network element.

In summary, the apparatus for deploying a service flow forwarding function according to this embodiment of the present invention can determine, according to the notification message sent by the control plane network element, the first forwarding rule including the at least one forwarding identifier and the identifier of the target forwarding plane network element, and send the first forwarding rule to the infrastructure forwarder. In comparison with the prior art, in a network based on separation of control plane network elements, configuration of an end-to-end forwarding rule is implemented through interaction between the control plane network element and the infrastructure controller. Therefore, flexibility of service flow forwarding is improved.

An embodiment of the present invention provides a system for deploying a service flow forwarding function. The system for deploying a service flow forwarding function includes a control plane network element, an infrastructure controller, a forwarding plane network element, an infrastructure forwarder, a base station, UE, and a packet data network, where the control plane network element includes the apparatus for deploying a service flow forwarding function as shown in any one of FIG. 9-1 to FIG. 9-8; and the infrastructure controller includes the apparatus for deploying a service flow forwarding function as shown in any one of FIG. 10-1 to FIG. 10-3.

An embodiment of the present invention provides a system for deploying a service flow forwarding function. The system for deploying a service flow forwarding function includes a control plane network element, an infrastructure controller, a forwarding plane network element, an infrastructure forwarder, a base station, UE, and a packet data network, where the control plane network element includes the apparatus for deploying a service flow forwarding function as shown in FIG. 11-1 or FIG. 11-2; and the infrastructure controller includes the apparatus for deploying a service flow forwarding function as shown in FIG. 12.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method of deploying a service flow forwarding function, the method implemented in an apparatus applied in a control plane network element, the method comprising:

sending, by a transmitter of the apparatus, a notification message to an infrastructure controller, wherein the notification message comprises at least one forwarding identifier corresponding to a user service flow and comprises an identifier of a target processor in a forwarding plane network element providing service processing for the user service flow, wherein the notification message is used to instruct the infrastructure controller to determine a first forwarding rule comprising the at least one forwarding identifier and the identifier of the processor in the target forwarding plane network element and send the first forwarding rule to an infrastructure forwarder controlled by the infrastructure controller, and wherein after sending the notification message, the method further comprises:

receiving, by a receiver of the apparatus, an access request message from a user equipment (UE);

determining, by a processor of the apparatus, a first target forwarding plane network element identifier that corresponds to a processor in a first target forwarding plane network element serving the UE;

determining, by the processor according to the first target forwarding plane network element identifier, a first service flow forwarding identifier from the at least one forwarding identifier corresponding to the user service flow corresponding to the first target forwarding plane network element identifier; and sending, by the processor, a first service processing policy message to the processor in the first target forwarding plane network element, wherein the first service processing policy message comprises the first service flow forwarding identifier and a first service processing policy, and the first service processing policy is a policy for performing service processing on packets of the user service flow by the processor in the first target forwarding plane network element.

2. The method according to claim 1, further comprising: determining, by the processor, the processor in the first target forwarding plane network element serving the UE, wherein the processor in the first target forwarding plane network element is used to determine the at least one forwarding identifier corresponding to the user service flow.

3. The method according to claim 1, wherein the at least one forwarding identifier corresponding to the user service flow is a first service flow forwarding identifier, and before sending the notification message, the method further comprises:

receiving, by the receiver, the access request message from the UE;

determining, by the processor, the first service flow forwarding identifier and the first target forwarding plane network element identifier that corresponds to the processor in the first target forwarding plane network element serving the UE; and sending, by the transmitter, the first service processing policy message to the processor in the first target forwarding plane network element, wherein the first service processing policy message comprises the first service flow forwarding identifier and the first service processing policy, and the first service processing policy is the policy for performing service processing on packets of the user service flow by the processor in the first target forwarding plane network element.

4. The method according to claim 3, wherein after sending the first service processing policy message to the processor in the first target forwarding plane network element, the method further comprises:

sending, by the transmitter, a setup request message to a base station accessed by the UE, wherein the setup request message comprises the first service flow forwarding identifier.

5. The method according to claim 4, wherein after sending the setup request message to the base station, the method further comprises:

receiving, by the receiver, a setup response message from the base station, wherein the setup response message comprises instruction information of the base station; and sending, by the transmitter according to the instruction information of the base station, a second service processing policy message to the processor in the first target forwarding plane network element, wherein the second service processing policy message comprises the instruction information of the base station and a second service processing policy, and the second service processing policy is a policy for performing service processing on downlink packets of the user service flow by the processor in the first target forwarding plane network element.

6. The method according to claim 4, wherein after sending the setup request message to the base station, the method further comprises:

determining, by the processor, a second service flow forwarding identifier and a second target forwarding plane network element identifier corresponding to a processor in the second target forwarding plane network element serving the UE;

sending, by the transmitter, a third service processing policy message to the processor in the second target forwarding plane network element, wherein the third service processing policy message comprises the second service flow forwarding identifier and a third service processing policy, and the third service processing policy is a policy for performing service processing on uplink packets or downlink packets of the user service flow by the processor in the second target forwarding plane network element; and sending, by transmitter, a first modification request message comprising the second target forwarding plane network element identifier and the second service flow forwarding identifier to the infrastructure controller, wherein the first modification request message is used to instruct the infrastructure controller to determine a second forwarding rule comprising the second target forwarding plane network element identifier and the second service flow forwarding identifier and send the second forwarding rule to the infrastructure forwarder.

7. The method according to claim 6, wherein after sending the third service processing policy message to the processor in the second target forwarding plane network element, the method further comprises:

sending, by transmitter, an update request message to the base station, wherein the update request message comprises the second service flow forwarding identifier.

8. The method according to claim 1, wherein sending the notification message comprises:

sending, by the transmitter, the notification message to the infrastructure controller using a mobility controller and a software defined network controller.

9. The method according to claim 1, wherein each forwarding identifier in the at least one forwarding identifier is an Internet Protocol (IP) address of a forwarding plane network element, or an IP address and a tunnel endpoint identifier (TED) of a forwarding plane network element, or an IP address of the UE, or an IP address and a port number of the UE, or an IP quintuple of the user service flow; and the identifier of the processor in the target forwarding plane network element is a Media Access Control (MAC) address of the forwarding plane network element, or an IP address of the forwarding plane network element, or a port number of the forwarding plane network element.

10. An apparatus for deploying a service flow forwarding function, wherein the apparatus is applied in a control plane network element, and comprises:

a transmitter, configured to send a notification message to an infrastructure controller, wherein the notification message comprises at least one forwarding identifier corresponding to a user service flow and comprises an identifier of a processor in a target forwarding plane network element providing service processing for the user service flow, wherein the notification message is used to instruct the infrastructure controller to determine a first forwarding rule comprising the at least one forwarding identifier and the identifier of the processor in the target forwarding plane network element and send the first forwarding rule to an infrastructure forwarder controlled by the infrastructure controller;

a receiver; and a processor, wherein, after the transmitter sends the notification message:

the receiver is configured to receive an access request message from a user equipment (UE);

the processor is configured to:

determine a first target forwarding plane network element identifier that corresponds to a processor in the first target forwarding plane network element serving the UE; and determine, according to the first target forwarding plane network element identifier, a first service flow forwarding identifier from the at least one forwarding identifier corresponding to the user service flow corresponding to the first target forwarding plane network element identifier; and the transmitter is further configured to send a first service processing policy message to the processor in the first target forwarding plane network element, wherein the first service processing policy message comprises the first service flow forwarding identifier and a first service processing policy, and the first service processing policy is a policy for performing service processing on packets of the user service flow by the processor in the first target forwarding plane network element.

11. The apparatus according to claim 10, wherein the processor is further configured to determine a processor in the first target forwarding plane network element serving the UE, wherein the processor in the first target forwarding plane network element is used to determine the at least one forwarding identifier corresponding to the user service flow.

12. The apparatus according to claim 10, wherein the at least one forwarding identifier corresponding to the user service flow is a first service flow forwarding identifier, and wherein, before the transmitter sends the notification message:

the receiver is configured to receive the access request message from the UE;

the processor is configured to determine the first service flow forwarding identifier and the first target forwarding plane network element identifier that corresponds to the processor in the first target forwarding plane network element serving the UE; and the transmitter is further configured to send a first service processing policy message to the processor in the first target forwarding plane network element, wherein the first service processing policy message comprises the first service flow forwarding identifier and the first service processing policy, and the first service processing policy is the policy for performing service processing on packets of the user service flow by the processor in the first target forwarding plane network element.

13. The apparatus according to claim 12, wherein the transmitter is further configured to send a setup request message to a base station accessed by the UE, wherein the setup request message comprises the first service flow forwarding identifier.

14. The apparatus according to claim 13, wherein the receiver is further configured to receive a setup response message from the base station, wherein the setup response message comprises instruction information of the base station; and the transmitter is further configured to send, according to the instruction information of the base station, a second service processing policy message to the processor in the first target forwarding plane network element, wherein the second service processing policy message comprises the instruction information of the base station and a second service processing policy, and the second service processing policy is a policy for performing service processing on downlink packets of the user service flow by the processor in the first target forwarding plane network element.

15. The apparatus according to claim 13, wherein the processor is further configured to determine a second service flow forwarding identifier and a second target forwarding plane network element identifier corresponding to a processor in a second target forwarding plane network element serving the UE;

the transmitter is further configured to send a third service processing policy message to the processor in the second target forwarding plane network element, wherein the third service processing policy message comprises the second service flow forwarding identifier and a third service processing policy, and the third service processing policy is a policy for performing service processing on uplink packets or downlink packets of the user service flow by the processor in the second target forwarding plane network element; and send a first modification request message comprising the second target forwarding plane network element identifier and the second service flow forwarding identifier to the infrastructure controller, wherein the first modification request message is used to instruct the infrastructure controller to determine a second forwarding rule comprising the second target forwarding plane network element identifier and the second service flow forwarding identifier and send the second forwarding rule to the infrastructure forwarder.

* * * * *

UNITED STATES PATENT AND TRADEMARK OFFICE
CERTIFICATE OF CORRECTION

PATENT NO. : 10,541,911 B2
APPLICATION NO. : 15/982471
DATED : January 21, 2020
INVENTOR(S) : Ni et al.

Page 1 of 1

It is certified that error appears in the above-identified patent and that said Letters Patent is hereby corrected as shown below:

Claim 9, Column 39, Line 67: "(TED)" should read -- (TEID) --.

Signed and Sealed this
Third Day of November, 2020

Andrei Iancu
*Director of the United States Patent and Trademark Office*